(12) United States Patent
Baxter

(10) Patent No.: US 7,146,395 B2
(45) Date of Patent: Dec. 5, 2006

(54) BANYAN SWITCHED PROCESSOR DATAPATH

(75) Inventor: Michael A. Baxter, Sunnyvale, CA (US)

(73) Assignee: Ricoh Company Ltd., Tokyo (JP)

(*) Notice: Subject to any disclaimer, the term of this patent is extended or adjusted under 35 U.S.C. 154(b) by 1109 days.

(21) Appl. No.: 09/933,777

(22) Filed: Aug. 20, 2001

(65) Prior Publication Data

US 2003/0108040 A1 Jun. 12, 2003

(51) Int. Cl.
*G06F 7/38* (2006.01)
(52) U.S. Cl. .................................................. 708/490
(58) Field of Classification Search ................ 708/400, 708/402, 409, 490; 712/10, 11, 15–16, 229
See application file for complete search history.

(56) References Cited

U.S. PATENT DOCUMENTS

| | | | | |
|---|---|---|---|---|
| 4,868,776 | A * | 9/1989 | Gray et al. | 708/405 |
| 5,481,743 | A * | 1/1996 | Baxter | 712/23 |
| 5,801,975 | A * | 9/1998 | Thayer et al. | 708/402 |
| 6,434,583 | B1 * | 8/2002 | Dapper et al. | 708/409 |
| 6,781,408 | B1 * | 8/2004 | Langhammer | 326/41 |

OTHER PUBLICATIONS

Article by Chuck Hastings, entitled "Shift Matrices: The Missing Teeth in the Number Cruncher"; Wescon/79 Professional Program Session Record, Session 99 reprint, paper 99/2; Nov. 18-19, 1979.

Article by Kenneth Batcher, entitled "The Flip Network in Staran"; IEEE Computer Society, p. 65-71 Aug. 24-27, 1976.

Article by Goke et al., entitled "Banyan Networks for Partitioning Multiprocessor Systems" The Institute of Electrical and Electronics Engineers, Inc. p. 21-28 1973.

Article by Premkumar et al., entitled "Design and Implementation of the Banyan Interconnection Network in TRAC" The National Computer Conference, p. 643-653 1980.

Article by Schwederski et al., entitled "Optimizing Task Migration Transfers Using Multistage Cube Networks" The Pennsylvania State University, vol. 1 p. 51-58 1990.

* cited by examiner

*Primary Examiner*—Tan V. Mai
(74) *Attorney, Agent, or Firm*—Fenwick & West LLP

(57) ABSTRACT

Data-processing systems including processor datapaths that efficiently support computationally advantageous routing operations are disclosed. Data-processing methods based on such systems are also disclosed. An exemplary data-processing system includes a register file, a routing unit, a Banyan switch, and an arithmetic logic unit. The arithmetic logic unit may include a bitwise function unit, pipeline register, and an accumulator. The Banyan switch may have N data inputs and $\log_M(N)$ switching stages. M may equal 2 or 4. In the case of $\log_2(N)$ stages, each switching stage has N/2 switching cells. The routing unit may include a control logic that generates a control signal, and various logics that respectively operate on various bit groups of the control signal.

31 Claims, 15 Drawing Sheets

BANYAN SWITCHED PROCESSOR DATAPATH

BACKGROUND OF THE INVENTION

1. Field of the Invention

The present invention generally relates to processor architectures and data routing structures. More particularly, the present invention is a system and method for implementing data processing using a Banyan switch.

2. Description of the Related Art

In general, two types of tasks may be performed in a computing environment (i.e., data transformation and data transfer). Data transformation encompasses the manners in which the content of data signals may be selectively altered, such as via mathematical or logical operations. Data transformation is often viewed as the "useful work" performed by a computing system.

Data transfer encompasses the manners in which data signals are moved from a source to a destination. Data transfer is facilitated via an interconnect structure or network, which comprises a particular architectural organization of couplings capable of exchanging data signals between a set of nodes. The nodes may include one or more data sources and one or more data destinations, and the nodes may comprise one or more of processing units, memories, and input/output (I/O) devices.

Interconnect networks generally fall into two categories, static and dynamic. A static interconnect network is characterized by fixed internode couplings, and the couplings between any pair of nodes comprise an unchanging set of mappings. The static interconnect network may have the form of rings, trees, arrays and meshes, tori, hypercubes, k-ary n-cubes, and/or variants thereof. FIG. 1 illustrates an exemplary prior art interconnect mesh having couplings that facilitate information exchange between a node 100 and its four nearest-neighbor nodes 110.

In a dynamic interconnect network, a collection of switching elements facilitate selectable coupling between sets of nodes (i.e., data sources and destinations). In other words, the switching elements control the pathways by which information may be exchanged between various nodes. The simplest dynamic interconnect network may be a bus, which can selectably handle one data transfer transaction at a time between a set of data sources and a set of data destinations. Other types of dynamic interconnect networks include multistage switched networks such as crossbar, Omega, Butterfly, and Banyan networks. Multistage dynamic interconnect networks are much more versatile and fault-tolerant than buses.

FIG. 2 is a block diagram of an exemplary 4×4 Banyan network or switch 200. In general, an N×N Banyan switch may comprise $\log_2 N$ or $\log_4 N$ stages of switching elements, and each stage includes N inputs and N outputs. In the case of $\log_2 N$ stages, the Banyan switch 200 comprises two stages 210 and 212, labeled as stage 0 and stage 1, each of which has four inputs and four outputs. The inputs to stage 0 and the outputs of stage 1 respectively form the inputs and outputs of the Banyan switch 200. The outputs of stage 0 are coupled to the inputs of stage 1. One half of the couplings are straight across from stage-to-stage, and the other half forms a crossover pattern from stage-to-stage as shown in FIG. 2.

Each switching stage 210 and 212 comprises a set of switching cells 220. Switching cells 220 may be conventional crossbar switches, capable of transferring signals from any switching cell input to any switching cell output. In the event that an N×N Banyan switch is implemented using 2×2 (i.e., two inputs and two outputs) switching cells 220, each switching stage 210 and 212 comprises N/2 switching cells 220. Each switching cell 220 has a control input 222 for selecting a given switching cell input routed to a given switching cell output. In conjunction with the couplings between switching stages, the set of control inputs 222 determines how data signals present at the inputs of the Banyan switch are routed to the Banyan switch outputs.

Larger, more complex Banyan switches have a greater number of inputs and outputs and support a larger number of input-to-output routing possibilities. For example, FIG. 3 is a block diagram of an exemplary 8×8 Banyan switch 300. The switch 300 has eight inputs and eight outputs, and comprises three switching stages 310, 312 and 314. Each switching stage contains four 2×2 switching cells 320, and each switching cell has a switching cell control input that is not shown in FIG. 3 but is similar to the control inputs 222 in FIG. 2.

In general, the input-to-output mappings inherently provided by the internal architecture of an interconnect network implement particular types of data routing functions or operations. These data routing functions may include shifting, rotation, permutation, exchange, or other functions. For example, the internal couplings within a Banyan switch inherently support $2^K-1$ shifting and permutations. The execution of such inherent routing functions does not carry a time penalty relative to direct pass-through routing.

Functions such as shifting, rotation, and permutation may also be important within the context of data transformation, either by themselves or as part of a sequence of computational operations. For example, floating point computations may require normalization operations, which can be carried out via shifting. Even though interconnect networks can perform these routing operations with high efficiency, modern processor architectures fail to perform these operations efficiently because the architectures typically implement these functions through successive single-bit shifts.

Hence what is needed is a processor datapath that efficiently supports computationally-advantageous data routing operations.

SUMMARY OF THE INVENTION

The present invention is a system and a method for data processing with a Banyan switch. The system comprises a register file, a routing unit, a Banyan switch, a switch control unit, a constant generator, and an arithmetic logic unit. The arithmetic logic unit comprises a bitwise function unit, a pipeline register, and an accumulator. The Banyan switch may have an internal bitwidth of w and comprise N switching stages. N may equal to $\log_2(w)$ or $\log_4(w)$. In the case of $\log_2(w)$ stages, each switching stage has N/2 switching cells. The routing unit comprises control logic generating a control signal, and various logics that respectively operate on various bit groups of the control signal. The switch control unit comprises a shift constants generator, a pipeline flip-flop, and a switch tree.

A method of processing data comprises the step of reading and writing addresses and data, the step of selectively aligning and transferring data, the step of controlling information pathways and performing routing functions, the step of generating control signals that determine particular routing and/or bitfield manipulation operations, the step of selectively generating and outputting constants and bitfield mask primitives, and the step of performing arithmetic functions and logic functions. The step of performing arithmetic functions and logic functions comprises performing bitwise functions, performing register functions, and performing additions. The step of controlling information pathways and performing routing functions comprises N sub-steps of controlling information pathways and performing routing functions in stages, each of the N sub-steps having N/2 sub-steps of transferring signals from any input to any output. The step of selectively aligning and transferring data comprises the sub-step of generating a control signal and the sub-step of operating on various bit groups of the control signal. The sub-step of generating control signals that determine particular routing and/or bitfield manipulation operations comprises outputting a shift code, performing flip-flop functions, and generating and outputting switch control signals.

BRIEF DESCRIPTION OF THE DRAWINGS

FIGS. 6B-1 and 6B-2 are a table that shows data of various output bits of the routing unit.

FIGS. 8A-1 and 8A-2 are a block diagram of an embodiment for a Banyan switch.

DETAILED DESCRIPTION OF THE PREFERRED EMBODIMENTS

The present invention is a processor datapath that includes an embedded Banyan switch. The Banyan switch, in conjunction with additional datapath elements, selectively performs data routing functions to advantageously support or implement computational operations. For example, the Banyan switch may perform cyclic permutations upon bitfields within a data word during a sequence of image processing operations. The structure of the present invention and its functionality in supporting particular types of computational operations are described in detail below.

Figure 1:
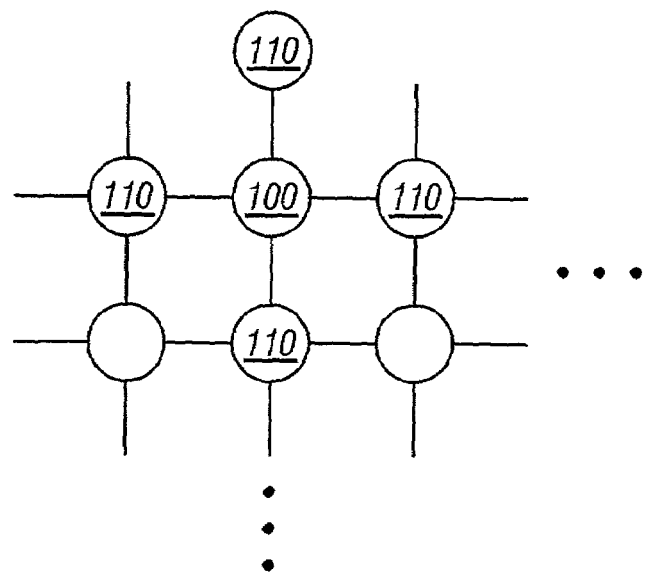
FIG. 1 is a block diagram of an exemplary interconnect mesh.
Figure 2:
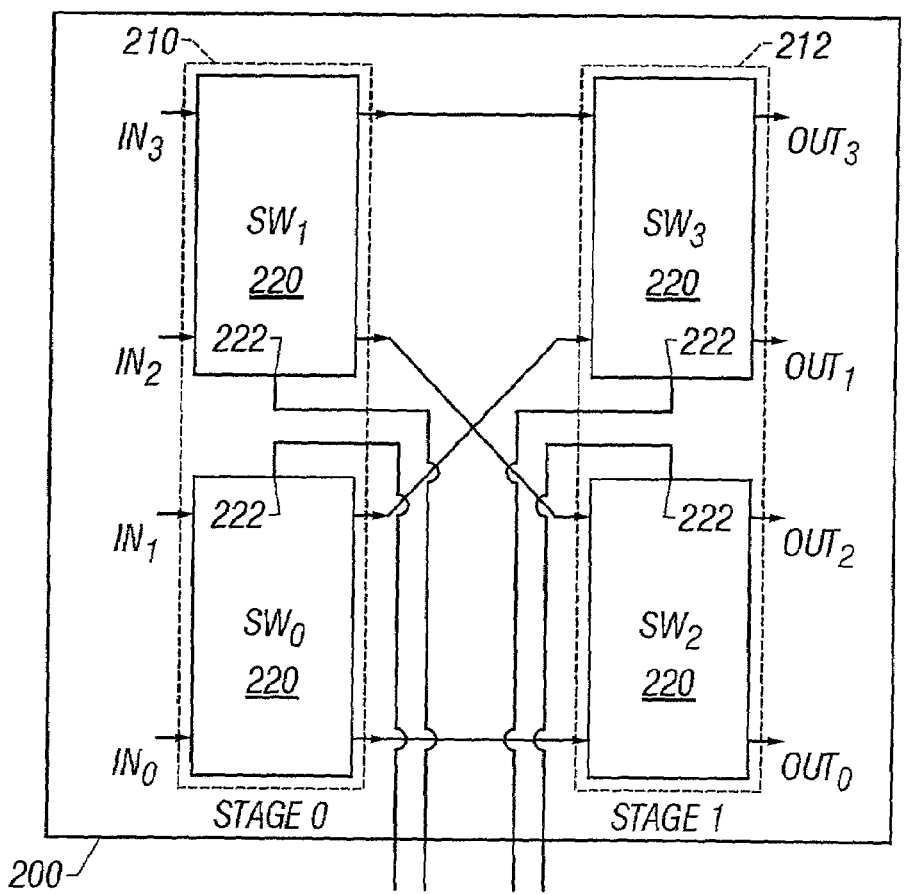
FIG. 2 is a block diagram of an exemplary 4×4 Banyan switch.
Figure 3:
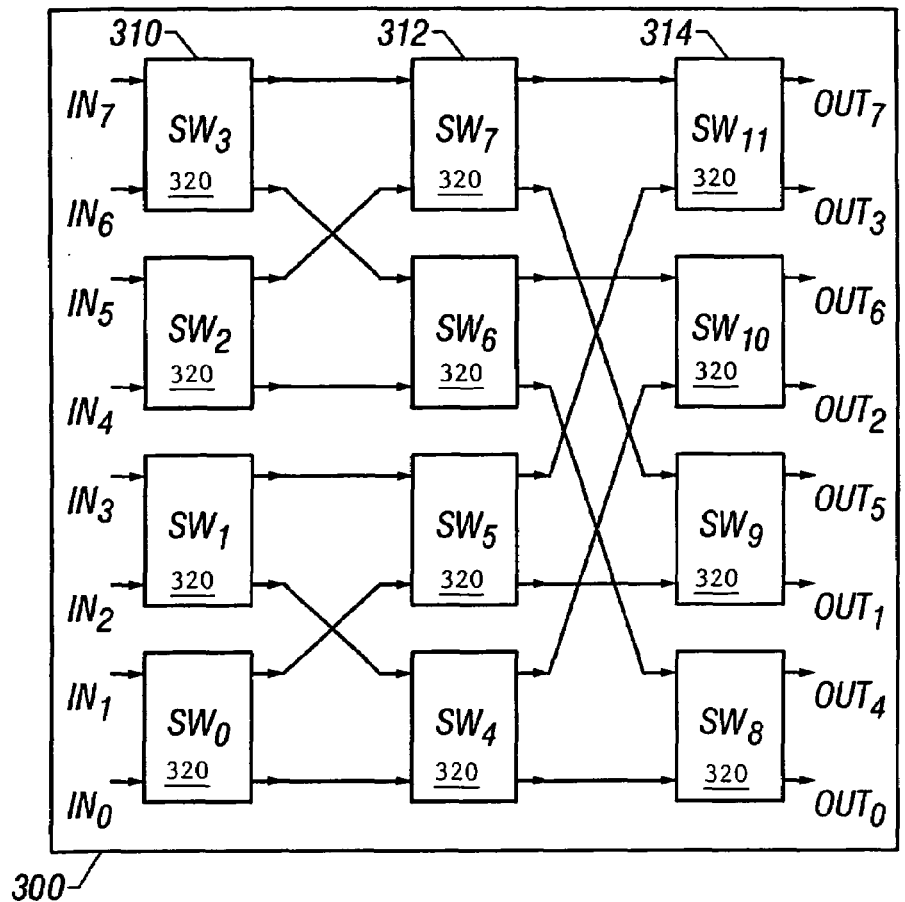
FIG. 3 is a block diagram of an exemplary 8×8 Banyan switch.
Figure 4:
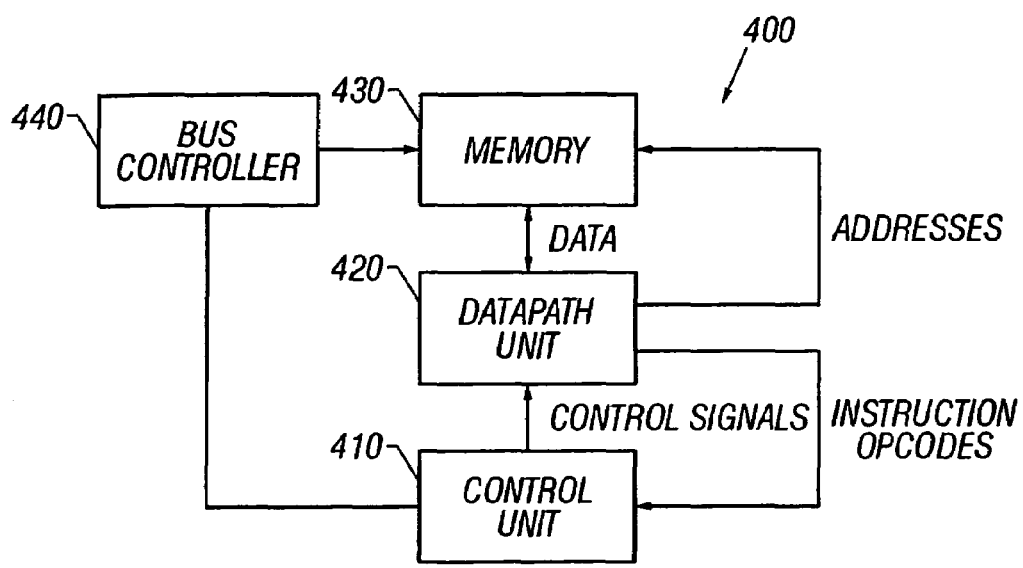
FIG. 4 is a block diagram showing portions of a generalized processor architecture constructed according to the present invention.

FIG. 4 is a block diagram showing portions of a generalized processor architecture 400 according to the present invention. In the generalized processor architecture 400, a control unit 410 directs sequences of operations performed by a datapath unit 420, a memory 430, and a bus controller 440. In response to control signals received from the control unit 410, the datapath unit 420 retrieves information from the memory 430, and such information may include both instructions and operands. The datapath unit 420 transfers instruction opcodes to the control unit 410, where such opcodes correspond to control signal sequences for the implementation of particular operations. Under the direction of the control unit 410, the datapath unit 420 performs particular operations upon data received from the memory 430, and/or transfers data to the memory 430. The present invention provides a datapath unit 420 that incorporates a Banyan switch. The Banyan switched datapath 420 has a minimum fanout requirement for the coupling between the datapath 420 and the memory 430 in implementing a whole computer.

Figure 5:
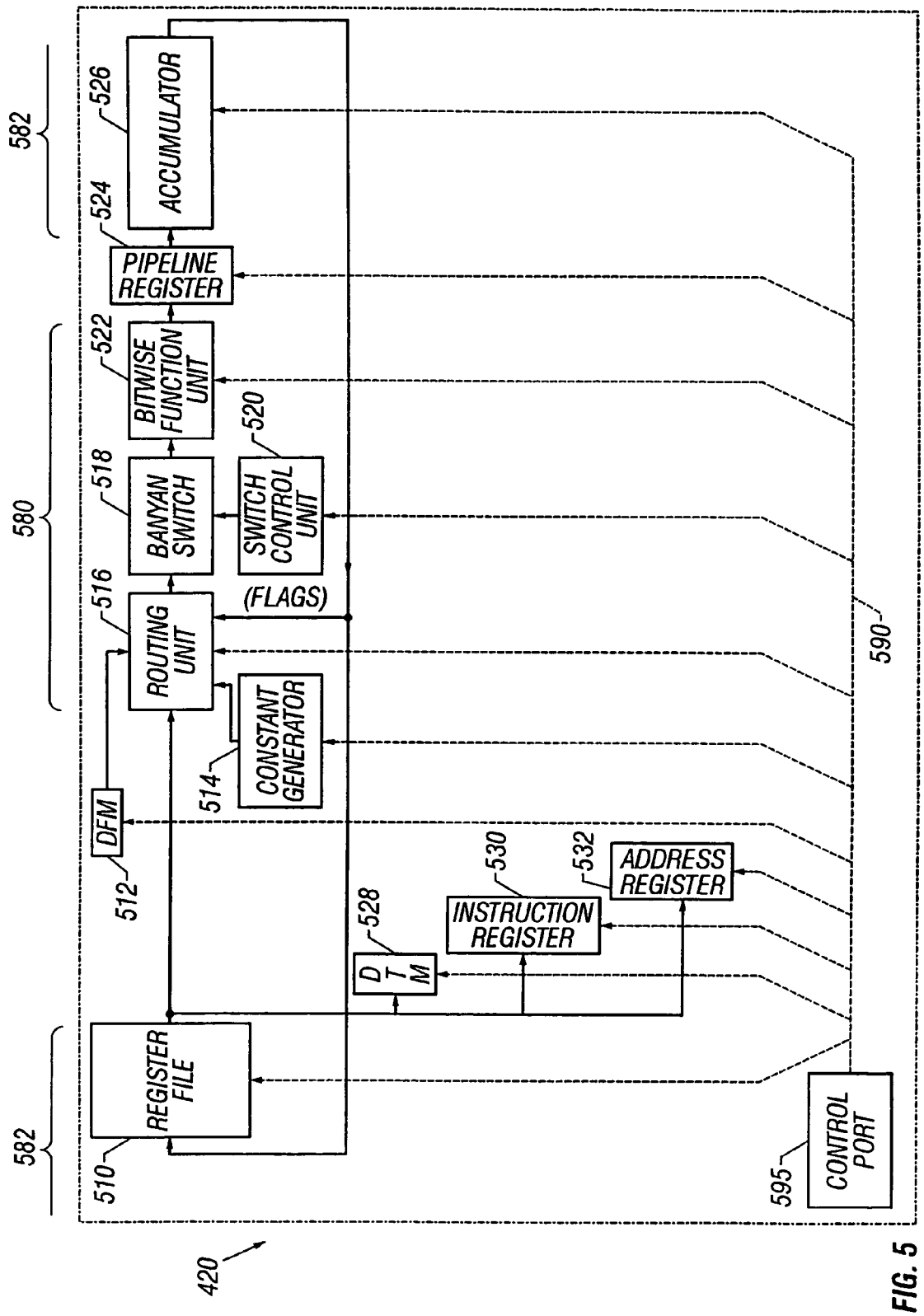
FIG. 5 is a block diagram of a preferred embodiment of a Banyan-switched datapath.

FIG. 5 is a block diagram of a Banyan switched datapath 420 constructed in accordance with the present invention. The Banyan switched datapath 420 comprises a register file 510, a data from memory (DFM) register 512, a constant generator 514, a routing unit 516, a Banyan switch 518, a switch control unit 520, a bitwise function unit 522, a pipeline register 524, an accumulator 526, a data to memory (DTM) register 528, an instruction register 530, and an address register 532. The bitwise function unit 522, the pipeline register 524, and the accumulator 526 together form an arithmetic logic unit. The register file 510, the DFM register 512, and the constant generator 514 each include a data output coupled to a data input of the routing unit 516. The routing unit 516 also includes a flag input coupled to a flag output of the accumulator 526. Additionally, the routing unit 516 includes a data output coupled to a data input of the Banyan switch 518, which itself includes a data output coupled to a data input of the bitwise function unit 522. The bitwise function unit 522 has a data output coupled to a data input of the pipeline register 524. The accumulator 526 has a data input coupled a data output of the pipeline register 524, and has a data output coupled to a data input of the register file 510.

The DFM register 512 includes a data input coupled to a memory 430. The DTM register 528, the instruction register 530, and the address register 532 respectively include a data input, an instruction input, and an address input coupled to the register file's data output. The instruction register 530 includes an instruction output coupled to a control unit 410, while the DTM and address registers 528, 532 respectively include a data output and an address output coupled to the memory 430. Each element of the Banyan switched datapath 420 includes a set of control inputs coupled to a control line 590, with the exception of the Banyan switch 518 itself, which includes a set of control inputs coupled to control outputs of the switch control unit 520. Finally, the control line 590 is coupled to a control port 595, which facilitates signal exchange with a control unit 410.

One or more instances of the present invention may be implemented within a Reconfigurable or Reprogrammable Logic Device (RLD) such as a Field Programmable Gate Array (FPGA) manufactured by Xilinx. An RLD includes a set of Configurable Logic Blocks (CLBs), selectively reprogrammable interconnect structures, data storage resources, and other types of resources to facilitate implementation of a wide range of complex logic functionality. Each CLB comprises selectively reprogrammable circuitry that can generate logic functions, store data, and route signals. The selectively reprogrammable interconnect structures of an RLD comprise one or more types of interconnect lines and/or signal routing matrices that facilitate flexible coupling between CLBs, data storage resources, and/or other RLD resources. In general, many of the interconnect structures of an RLD are laid out or distributed to inherently support crossover couplings, like those found within a Banyan switch. Thus, an RLD may provide an excellent or near-optimum platform for implementing the preferred embodiment of the present invention.

In a reconfigurable implementation, the present invention may support a multiplicity of instruction set architectures (ISAs) and corresponding instruction and data word sizes. The present invention may comprise a portion of a dynamically reconfigurable computer architecture, such as that described in U.S. Pat. No. 5,794,062, which is incorporated herein by reference. In accordance with such an architecture, the present invention relies upon a bit-addressable memory, and defines an instruction-set dependent constant $K_{isa}$. Within a memory address, a number of bits equal to $K_{isa}$ are reserved for bitwise addressing within a w-bit word. Thus, for any given ISA with corresponding word size w, $K_{isa}$ equals $\log_2(w)$, in other words $2^{Kisa}$ equals w.

In FIG. 5, the register file 510, the DFM register 512, the constant generator 514, and the flag output of the accumulator 526 each may serve as sources for data signals directed to the routing unit 516, in order to support instruction processing operations. The routing unit 516 serves as a signal assembly and/or selection gateway for data signals en route to the accumulator 526 via the Banyan switch 518. The Banyan switch 518 selectively shifts or rotates signals it receives, under the direction of the switch control unit 520. The bitwise function unit 522 selectively performs Boolean and/or bitfield operations upon signals received from the Banyan switch 518. Taken together, the data routing unit 516, the Banyan switch 518, and the bitwise function unit 522 define a first signal propagation path 580, while the accumulator 526 plus the register file 510 define a second signal propagation path 582. The pipeline register 524 serves as a signal delay isolation or matching interface between the first and second signal propagation paths 580 and 582. In a preferred embodiment, the bitwidths of the first and second signal propagation paths 580 and 582 each equals 64. Those skilled in the art will understand that other datapath bitwidths, for example, 128 or 256 bits, could be supported in other embodiments.

The Banyan switched datapath 420 is capable of performing monadic operations upon an operand A to generate a result C, as well as dyadic operations upon a first operand A and a second operand B to generate a result C. The register file 510 provides internal state storage for instruction processing. In particular, the register file 510 may serve as a source for providing operands A and B as required, and a destination for storing a result C. The register file 510 may further provide storage for instructions received or retrieved from the memory 430, plus storage for a program counter that indicates a next address at which an instruction resides.

Figure 6A:
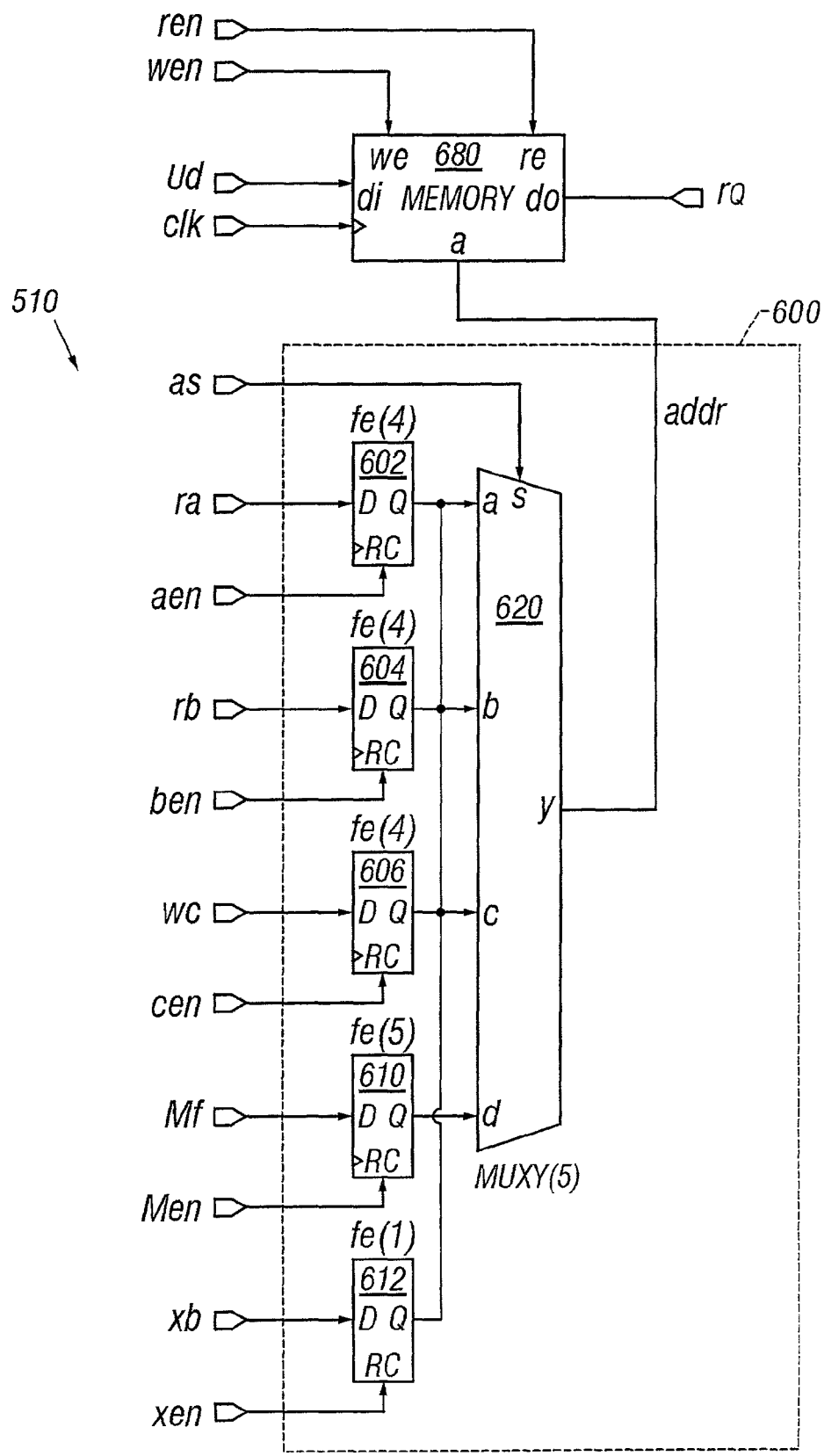
FIG. 6A is a block diagram of an embodiment of a register file.

FIG. 6A is a block diagram of one embodiment of a register file 510 of the present invention. In one embodiment, the register file 510 comprises an address selection unit 600 and a memory 680. The address selection unit 600 may comprise a first address register 602, a second address register 604, a third address register 606, an instruction address register 610, an address increment register 612, and an address selection multiplexor 620. The first address register 602 comprises four circuitry units, one of which is shown in FIG. 6A. Similarly, the second address register 604 comprises four circuitry units, one of which is shown in FIG. 6A. The third address register 606 comprises four circuitry units, one of which is shown in FIG. 6A. The instruction address register 610 comprises five circuitry units, one of which is shown in FIG. 6A. With the exception of the address increment register 612, each of the aforementioned registers includes an address input, an enable input, and an output, and the address and enable inputs are coupled to the control line 590. The address increment register 612 includes an increment input, an enable input, and an output. The output of the address increment register 612 is coupled to the outputs of the first address register 602, the second address register 604, and the third address register 606. The address selection multiplexor 620 has inputs coupled to the outputs of aforementioned registers. In addition, the address selection multiplexor 620 has a 2-bit selection input and a 5-bit address output, and the selection input is coupled to the control line 590.

The memory 680 comprises conventional data storage circuitry, and has a read enable input, a write enable input, an address input, a data input, a data output, and a clock input. The data input and data output form the data input and data output of the register file 510 respectively. The address input is coupled to the address output of the address selection multiplexor 620, and the read enable, write enable, and clock inputs are coupled to the control line 590.

With respect to instruction processing operations, the first, second, and third address registers 602, 604 and 606 may be utilized to specify a source address for an operand A, a source address for an operand B, and a destination address for a result C, respectively. The instruction address register 610 specifies an address corresponding to an instruction to be transferred to the instruction register 530.

In FIG. 5, the DFM register 512 may comprise a conventional register that serves as a data transfer interface for signals received or retrieved from the memory 430 and directed to the Banyan switched datapath 420. The DFM register 512 includes a clock input and an enable input, which respectively receive a clock signal and a load enable signal from the control line 590. In response to the load enable signal and the clock signal, the DFM register 512 loads data signals present at its data input. As indicated above, the DFM register's data output delivers data signals to the routing unit 516.

In one embodiment, bitwidth of the data input and the data output of the DFM register 512 differs from that of the first and second signal propagation paths 580 and 582. For example, the DFM register 512 may support a bitwidth of 16 bits, while the first and second signal propagation paths 580 and 582 may provide a 64-bit datapath. Such an embodiment may be required by constraints on data bus bitwidth. In such an embodiment, assembling a data word that has a bitwidth equal to that supported by the Banyan-switched datapath 420 may take multiple clock cycles when transferring data from the memory 430 to the Banyan-switched datapath 420. Those skilled in the art will recognize that in another embodiment, the DFM register 512 could serve as a buffer capable of performing such data word assembly by itself. Those skilled in the art will also understand that in yet another embodiment, the bitwidth of the DFM register 512 could match that of the signal propagation paths 580 and 582.

Referring back to FIG. 5, the constant generator 514 selectively generates and outputs constants and bitfield mask primitives under the direction of control signals that the constant generator receives via the control line 590. If the Banyan-switched datapath 420 supports a bitwidth w, the constants each comprise a w-bit signal having a particular value ranging between 0 and $2^w-1$. The mask primitives each comprise a w-bit signal having a particular number of least-significant bits set to a predetermined value such as binary 1, where the remaining higher-order bits are set to the opposite binary value, i.e., zero. Herein, the preset least-significant bits are defined as a "seed mask" or a "proto-mask." As further described below, the Banyan switch 518 may selectively align or rotate a seed mask to a given position within a w-bit word according to instructions that operate upon bit sequences spanning fewer than w bits. For example, byte operations may be facilitated by an eight-bit seed mask, and consequently the Banyan switch 518 may align such a seed mask at a specific byte boundary within a w-bit word. Similar considerations apply to seed masks for operations upon 16-bit, 32-bit, or other-size bitfields within a w-bit word.

Table 1 shows an exemplary set of constant generator output signals as a function of particular control line signals. Specifically, in response to control line bits 0 through 2 collectively ranging from values 0 to 7, the constant generator 514 may generate and output a right zone mask, an 8-bit proto-mask, a 16-bit proto-mask, a 32-bit proto-mask, a 64-bit positive constant, or a complemented 64-bit constant, in response to the control bit values. In one embodiment, the constant generator 514 comprises a decoder. Those skilled in the art will recognize that the constant generator 514 could be implemented in a manners, such as via a look-up table.

TABLE 1

CONTROL LOGIC INTERFACE

| CTRL[2:0] Bits | Operation Performed |
|---|---|
| 000 | GENERATE RIGHT ZONE MASKS |
| 001 | GENERATE FIELD8 PROTO-MASK |
| 010 | GENERATE FIELD16 PROTO-MASK |
| 011 | GENERATE FIELD16 PROTO-MASK |
| 100 | GENERATE 64'B0 |
| 101 | GENERATE 64'B0 |
| 110 | GENERATE 64'B0 |
| 111 | GENERATE ~64'B0 |

The routing unit 516 selectively aligns and transfers data to the data input of the Banyan switch 518, in response to control signals received from the control line 590. Table 2A shows an exemplary set of alignment and routing operations provided by the routing unit 516 in response to control line bits 3 through 5. In particular, the routing unit 516 may transfer to the Banyan switch 518 the contents of the DFM register 512 conjoined with higher-order bits obtained via a register file read (RFR) operation. The routing unit 516 may also transfer a shifted positive constant, or a shifted two's complemented constant, to the Banyan switch 518. The routing unit 516 may also conjoin k flag bits received at its flag input with (w—k) higher-order bits obtained via a RFR operation, and transfer the resultant word to the Banyan switch 518. In one embodiment, the flag bits may include bits to indicate a zero result, a negative result, a carryout condition, and an overflow condition, in a manner readily understood by those skilled in the art. The routing unit 516 may also transfer to the Banyan switch 518 an m-bit constant sign-extended to span w bits where m may equal 16, a w-bit signal received from the constant generator 514, a w-bit signal received from the register file 510, or a signal left shifted by $(K_{isa}-2)$ bit positions.

TABLE 2A

CONTROL LOGIC INTERFACE

| CTRL[5:3] Bits | Operation Performed |
|---|---|
| 000 | PASS DFM AND UPPER 48-BITS RFR |
| 001 | PASS SHIFTED POSITIVE $V_K$ LITERAL |
| 010 | PASS SHIFTED NEGATIVE $V_K$ LITERAL |
| 011 | INSERT FLAGS AND PASS 60 MSBs RFR |
| 100 | PASS SK16 SIGN-EXTENDED, PRE-ROTATED |
| 101 | PASS K, CONGEN DATA THROUGH |
| 110 | PASS R, RFR DATA THROUGH |
| 111 | GENERATE(1<<KISA-2) |

Figures 6B-1, 6B-2:
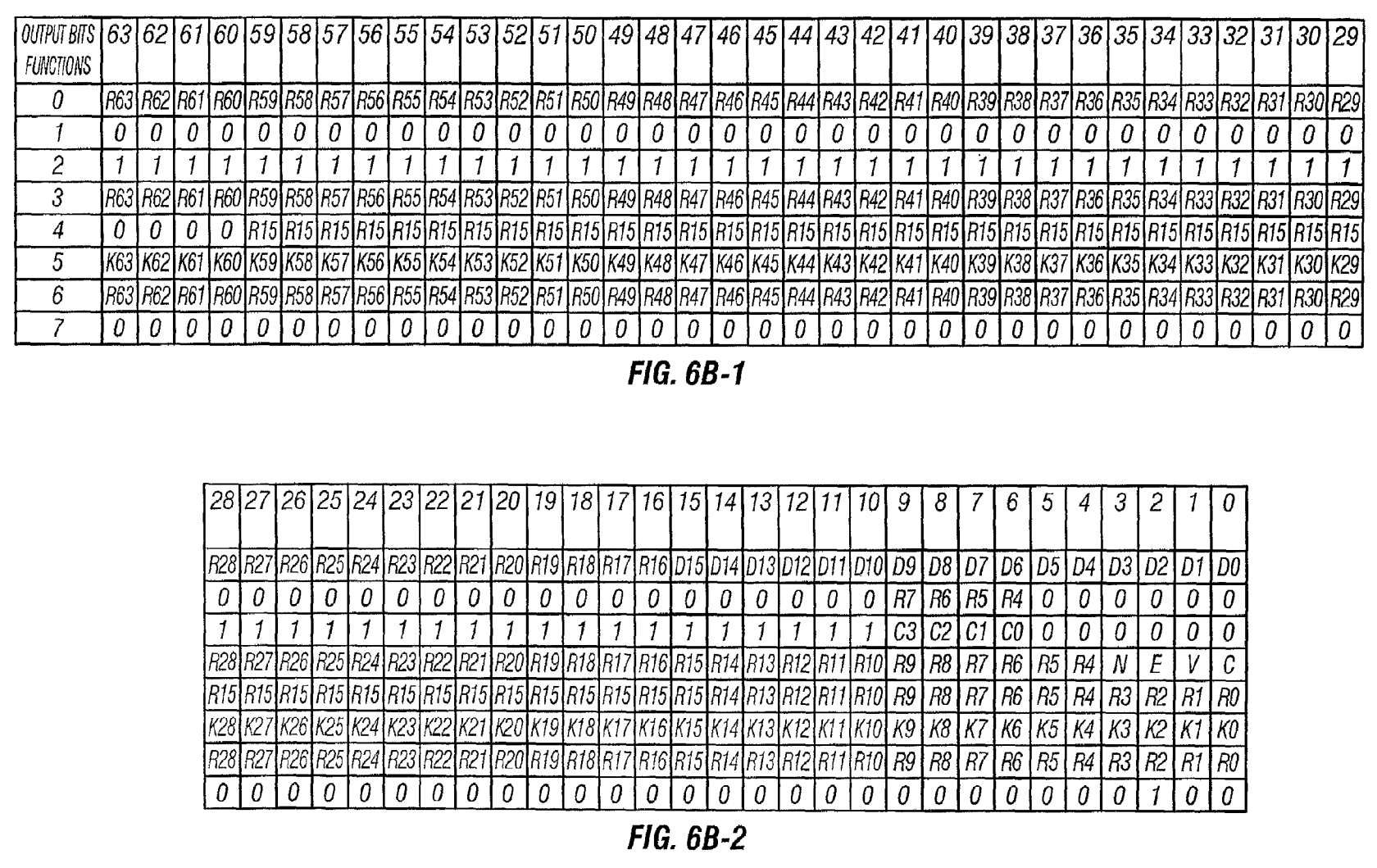

FIG. 6B is a table that shows data of various output bits of the routing unit 516. The routing unit 516 performs at least the following seven functions. Under Function 0, the routing unit 516 receives data from memory and transfers them through the Banyan switch 518 without rotation. Under Function 1, the routing unit 516 receives $V_k$ literal for $A_k$ instruction from the register file 510 and transfers the data through the Banyan switch 518 without rotation, pre-aligned left of binary point of $2^5$. Under Function 2, the routing unit 516 receives $V_k$ literal for $S_k$ instruction from the register file 510 and transfers the data through the Banyan switch 518 without rotation, two's complemented and are pre-aligned left of binary point of $2^5$. Under Function 3, the routing unit 516 inserts the process-control-word (pcw) flag. Under Function 4, the routing unit 516 receives $SK_{16}$ sign-extended and generates an output to be rotated RLC(4) with zero-fill pre-appended. Under Function 5, the routing unit 516 operates as a 64-bit constant bus. Under Function 6, the routing unit 516 operates as a 64-bit register file read bus. Finally, under Function 7, the routing unit 516 generates a value of KISA-2. When KISA equals 6, the routing unit 516 generates $2^2$.

For each of the above functions, FIG. 6B shows data for each output bit of the routing unit 516. The 64 output bits of the routing unit 516 are organized into seven groups. Group I includes bits 0 through 3, Group II includes bits 4 and 5, Group III includes bits 6 through 9, Group IV includes bits 10 through 15, Group V includes bits 16 through 59, and Group VI includes bits 60 through 63. In other words, Group I covers four bits, Group II covers two bits, Group III covers four bits, Group IV covers six bits, Group V covers forty-four bits, and Group VI covers four bits.

Table 2B, consistent with FIG. 6B, summarizes data for various bit-groups of the routing unit 516 under various functions. Group I may have a value of 0, flag insert, R3 through R0, K3 through K0, or D3 through D0. Group II may have a value of 0, R5 and R4, K5 and K4, or D5 and D4. Group III may have a value of R9 through R6, K9 through K6, C3 through C0, R7 through R4, or D9 through D6. Group IV may have a value of R15 through R10, K15 through K10, 1, 0, or D15 through D10. Group V may have a value of R59 through R16, K59 through K16, R15, 1, or 0. Finally Group VI may have a value of R63 through R60, K63 through K60, 0, or 1.

TABLE 2B

| BITS | DATA | NUMBER OF BITS | GROUP |
|---|---|---|---|
| 3-0 | 0, FLAG INSERT, R3–R0, K3–K0, D3–D0 | 4 | I |
| 5-4 | 0, R5–R4, K5–K4, D5–D4 | 2 | II |
| 9-6 | R9–R6, K9–K6, C3–C0, R7–R4, D9–D6 | 4 | III |
| 15-10 | R15–R10, K15–K10, 1, 0, D15–D10 | 6 | IV |
| 59-16 | R59–R16, K59–K16, R15, 1, 0 | 44 | V |
| 63-60 | R63–R60, K63–K60, 0, 1 | 4 | VI |

Figure 7A:
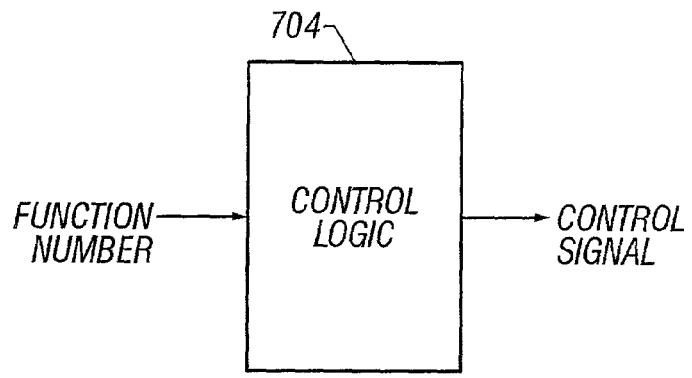
FIG. 7A is a block diagram of an embodiment for control logic of the routing unit.

FIG. 7A is a block diagram showing control logic of the routing unit 516. The control logic 704 receives a three-bit function numbered from 0 to 7 as discussed above, and consequently generates a 24-bit control signal for logics of the routing unit 516. Table 2C summarizes data of each bit of the control signal under various functions. The various bits of the control signal are organized into seven groups, Groups I, IA, II, III, IV, V, and VI. In addition, the various bits of the control signal are designated various symbols. For example, bit 0 corresponds to G1RG, bit 13 corresponds to G4RG, and bit 20 corresponds to G5SX. Each of the portions of the routing unit 516 has multiple units and only one is shown in FIGS. 7B–7H and described below for convenience and ease of understanding.

TABLE 2C

| Bit Groups | Functions Control Bits | 0 | 1 | 2 | 3 | 4 | 5 | 6 | 7 |
|---|---|---|---|---|---|---|---|---|---|
| GROUP I | G1RG | 0 | 0 | 0 | 0 | 1 | 0 | 1 | 0 |
| | G1FG | 0 | 0 | 0 | 1 | 0 | 0 | 0 | 0 |
| | G1DG | 1 | 0 | 0 | 0 | 0 | 0 | 0 | 0 |
| | G1KG | 0 | 0 | 0 | 0 | 0 | 1 | 0 | 0 |
| GROUP IA | G1AFK | 0 | 0 | 0 | 0 | 0 | 0 | 0 | 1 |
| GROUP II | G2RG | 0 | 0 | 0 | 1 | 1 | 0 | 1 | 0 |
| | G2KG | 0 | 0 | 0 | 0 | 0 | 1 | 0 | 0 |
| | G2DG | 1 | 0 | 0 | 0 | 0 | 0 | 0 | 0 |
| GROUP III | G3RG | 0 | 0 | 0 | 1 | 1 | 0 | 1 | 0 |
| | G3KG | 0 | 0 | 0 | 0 | 0 | 1 | 0 | 0 |
| | G3CG | 0 | 0 | 1 | 0 | 0 | 0 | 0 | 0 |
| | G3VG | 0 | 1 | 0 | 0 | 0 | 0 | 0 | 0 |
| | G3DG | 1 | 0 | 0 | 0 | 0 | 0 | 0 | 0 |
| GROUP IV | G4RG | 0 | 0 | 0 | 1 | 1 | 0 | 1 | 0 |
| | G4KG | 0 | 0 | 0 | 0 | 0 | 1 | 0 | 0 |
| | G4DG | 1 | 0 | 0 | 0 | 0 | 0 | 0 | 0 |
| | G4F1 | 0 | 0 | 1 | 0 | 0 | 0 | 0 | 0 |
| GROUP V | G5RK5 | 0 | 0 | 0 | 0 | 0 | 1 | 0 | 0 |
| | G5F0 | 0 | 1 | 0 | 0 | 0 | 0 | 0 | 1 |
| | G5F1 | 0 | 0 | 1 | 0 | 0 | 0 | 0 | 0 |
| | G5SX | 0 | 0 | 0 | 1 | 0 | 0 | 0 | 0 |
| GROUP VI | G6RK5 | 0 | 0 | 0 | 0 | 0 | 1 | 0 | 0 |
| | G6F0 | 0 | 0 | 0 | 0 | 1 | 0 | 0 | 1 |
| | G6F1 | 0 | 0 | 1 | 0 | 0 | 0 | 0 | 0 |

Figure 7B:
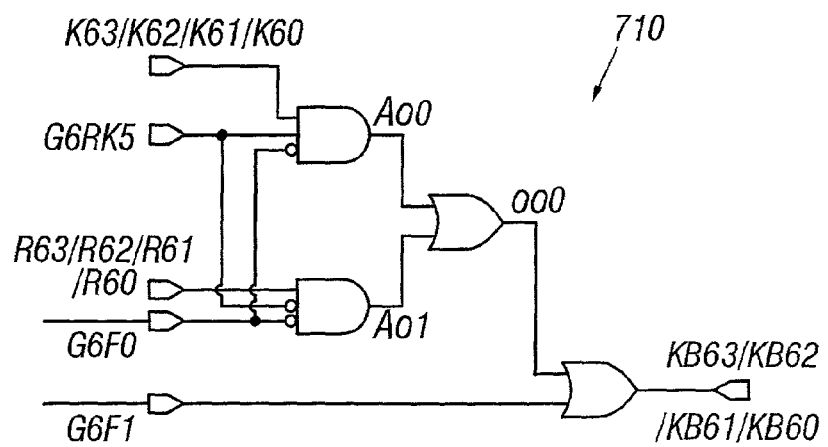
FIG. 7B is a block logic diagram for control logic generating Group-VI bits.

FIG. 7B is a block logic diagram for Group VI bits. The logic 710 comprises four circuitry units one of which is shown in FIG. 7B. The four units have different inputs and outputs. The inputs for the first unit are K63, G6RK5, and R63, and the output is KB63. The inputs for the second unit are K62, G6RK5, and R62, and the output is KB62. The inputs for the third unit are K61, G6RKS, and R61, and the output is KB61. The inputs for the fourth unit are K60, G6RK5, and R60, and the output is KB60.

Figure 7D:
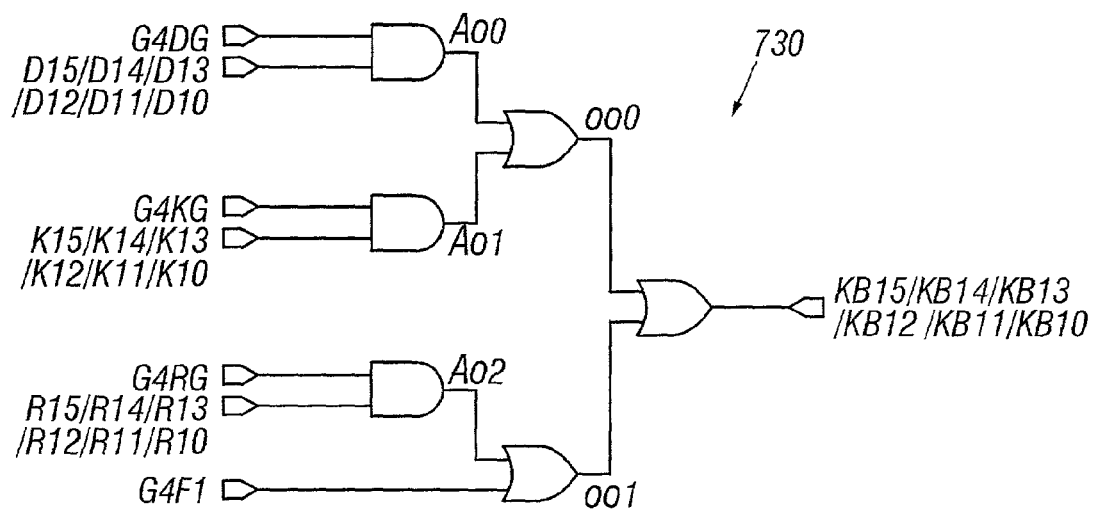
FIG. 7D is a block logic diagram for control logic generating Group-IV bits.
Figure 7C:
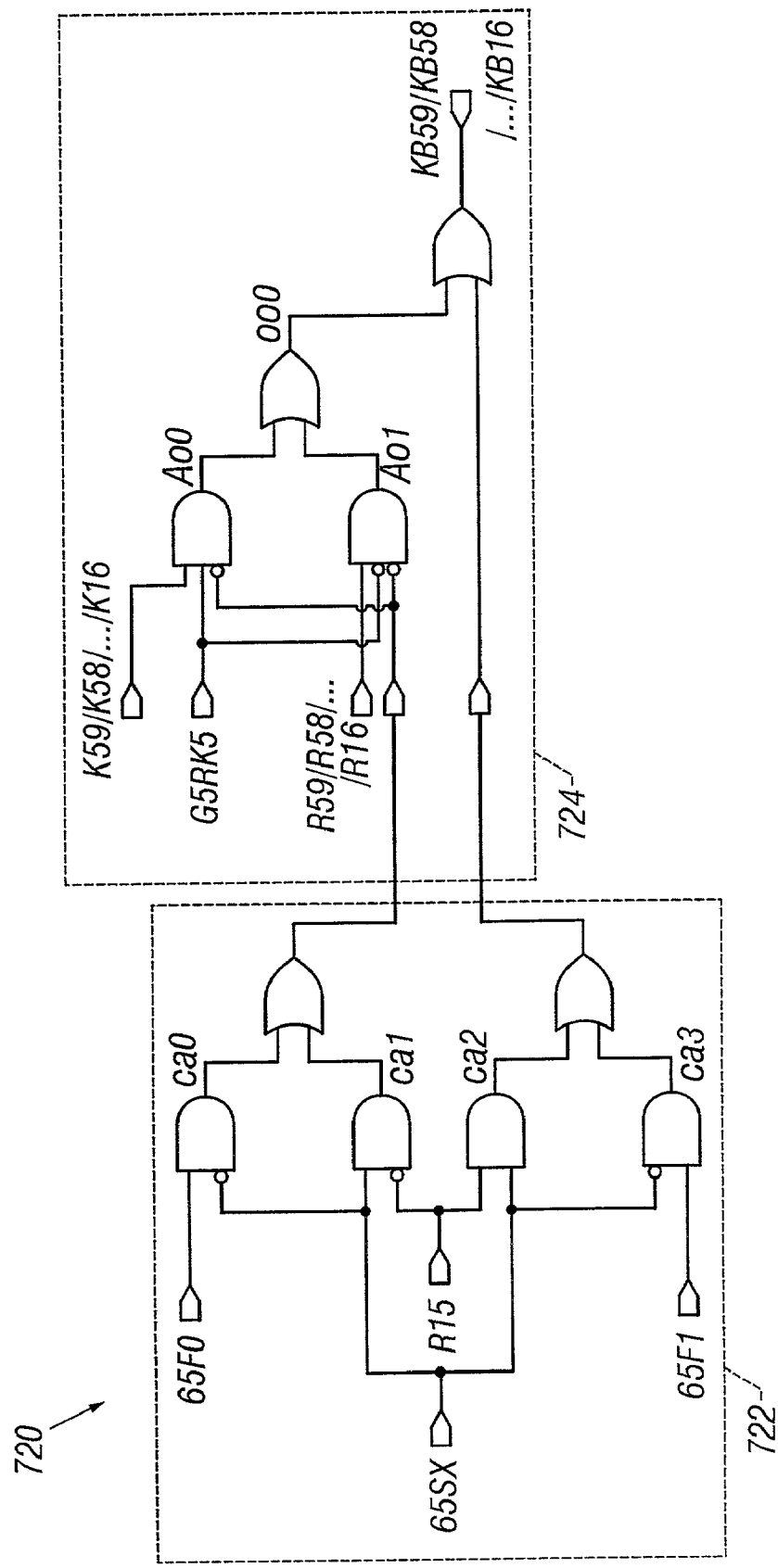
FIG. 7C is a block logic diagram for control logic generating Group-V bits.

FIG. 7C is a block logic diagram for Group V bits. The logic 720 comprises the sub-logic 722 and the sub-logic 724. The sub-logic 724 comprises forty-four circuitry units one of which is shown in FIG. 7B. The forty-four units have different inputs and outputs. For example, the inputs for the first unit are K59, G5RK5, and R59, and the output is KB59. The inputs for the second unit are K58, G5RK5, and R58, and the output is KB58. The inputs for the forty-fourth unit are K16, G5RK5, and R16, and the output is KB16.

FIG. 7D is a block logic diagram for Group IV bits. The logic 730 comprises 6 circuitry units one of which is shown in FIG. 7D. The six units have different inputs and outputs. The inputs for the first unit are G4DG, D15, G4KG, K15, G4RG, R15, and G4F1, and the output is KB15. The inputs for the second unit are G4DG, D14, G4KG, K14, G4RG, R14, and G4F1, and the output is KB14. The inputs for the third unit are G4DG, D13, G4KG, K13, G4RG, R13, and G4F1, and the output is KB13. The inputs for the fourth unit are G4DG, D12, G4KG, K12, G4RG, R12, and G4F1, and the output is KB12. The inputs for the fifth unit are G4DG, D11, G4KG, K11, G4RG, R11, and G4F1, and the output is KB11. The inputs for the sixth unit are G4DG, D10, G4KG, K10, G4RG, R10, and G4F1, and the output is KB10.

Figures 7E, 7F:
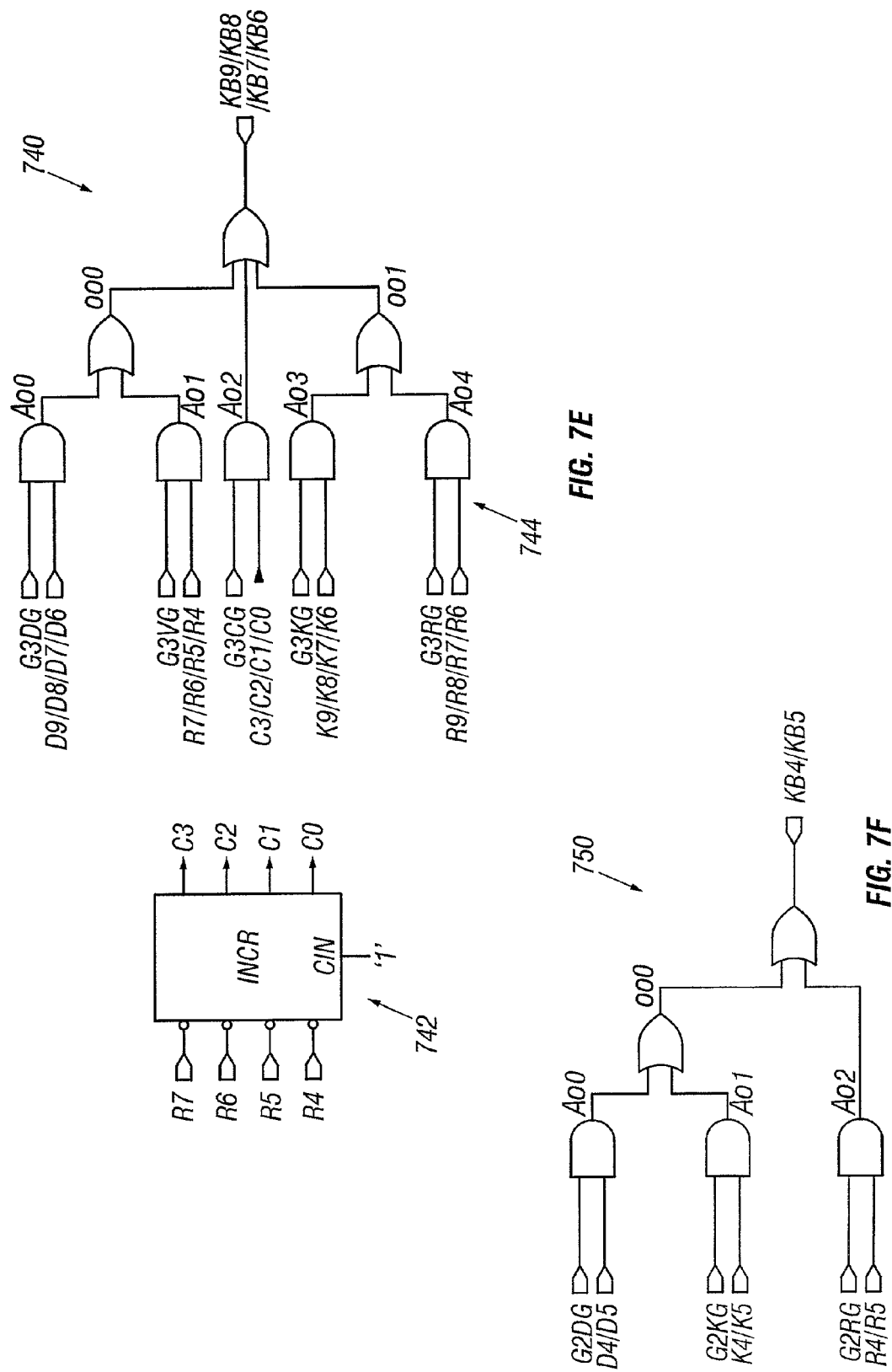
FIG. 7E is a block logic diagram for control logic generating Group-III bits.
FIG. 7F is a block logic diagram for control logic generating Group-II bits

FIG. 7E is a block logic diagram for Group III bits. The logic 740 comprises sub-logic 742 and 744. The sub-logic 742 generates C3 through C0 as inputs to the sub-logic 744. The sub-logic 744 comprises four circuitry units, one of which is shown in FIG. 7E. The four units have different inputs and outputs. The inputs for the first unit are G3DG, D9, G3VG, R7, G3CG, C3, G3KG, K9, G3RG, and R9, and the output is KB9. The inputs for the second unit are G3DG, D8, G3VG, R6, G3CG, C2, G3KG, K8, G3RG, and R8, and the output is KB8. The inputs for the third unit are G3DG, D7, G3VG, R5, G3CG, C1, G3KG, K7, G3RG, and R7, and the output is KB7. The inputs for the fourth unit are G3DG, D6, G3VG, R4, G3CG, C0, G3KG, K6, G3RG, and R6, and the output is KB6.

FIG. 7F is a block logic diagram for Group II bits. The logic 750 comprises two circuitry units, one of which is shown in FIG. 7F. The four units have different inputs and outputs. For example, the inputs for one unit are G2DG, D4, G2KG, K4, G2RG, and R4, and the output is KB4. Similarly, the inputs for the other unit are G2DG, D5, G2KG, K5, G2RG, and R5, and the output is KB5.

Figure 7G:
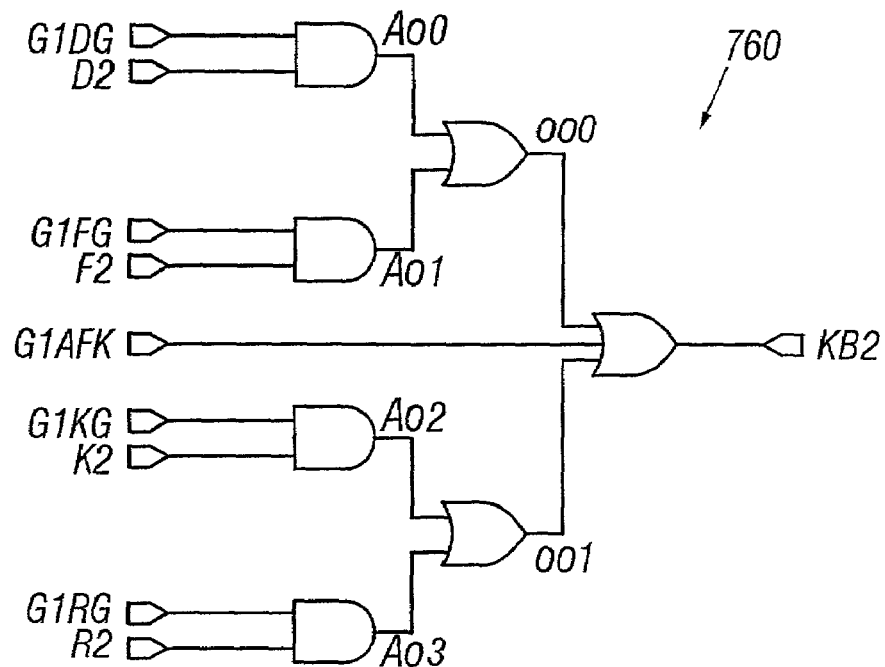
FIG. 7G is a block logic diagram for control logic generating Group-IA bits
Figure 7H:
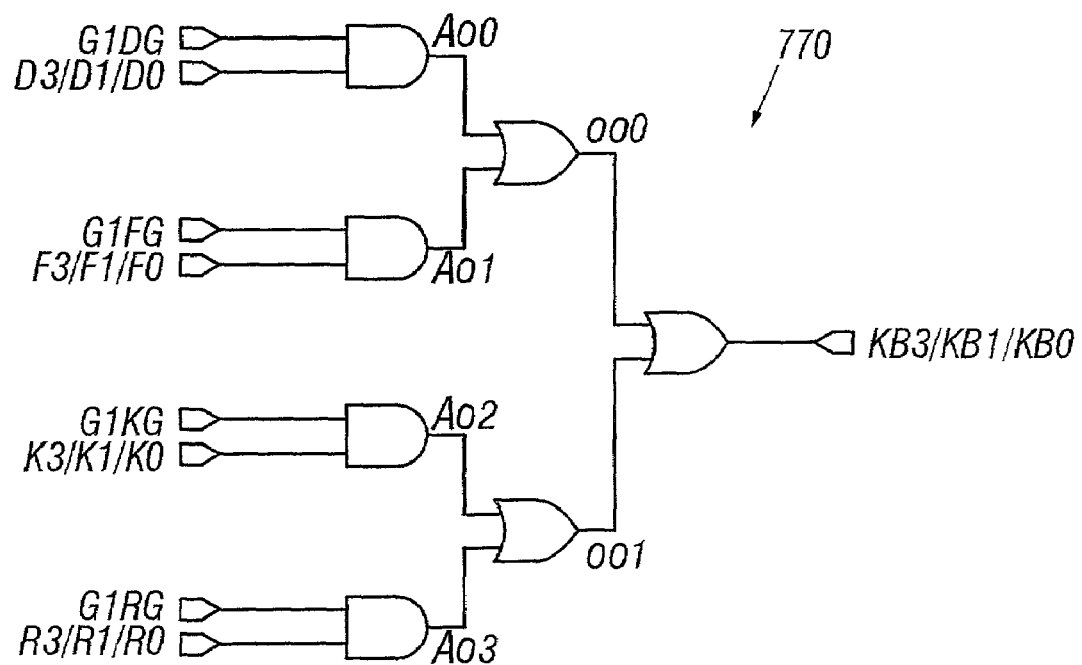
FIG. 7H is a block logic diagram for control logic generating Group-I bits

FIG. 7G is a block logic diagram for Group IA bits. The inputs for the logic 760 are G1DG, D2, G1FG, F2, G1KG, K2, G1RG, and R2, and its output is KB2. FIG. 7H is a block logic diagram for Group I bits. The logic 770 comprises three circuitry units, one of which is shown in FIG. 7H. The three units have different inputs and outputs. The inputs for the first unit are G1DG, D3, G1FG, F3, G1KG, K3, G1RG, and R3, and the output is KB3. The inputs for the second unit are G1DG, D1, G1FG, F1, G1KG, K1, G1RG, and R1, and the output is KB1. The inputs for the third unit are G1DG, D0, G1FG, F0, G1KG, K0, G1RG, and R0, and the output is KB0.

The Banyan switch 518 selectively performs circular and/or logical shift operations in response to control signals received from the switch control unit 520. The Banyan switch 518 may also serve as a bitfield manipulation resource for extracting and/or assembling bitfields spanning fewer than w bits. For example, the Banyan switch 518 may be used to progressively align one or more 64-bit data words in accordance with successive 16-bit boundaries.

Figures 1, 8A:
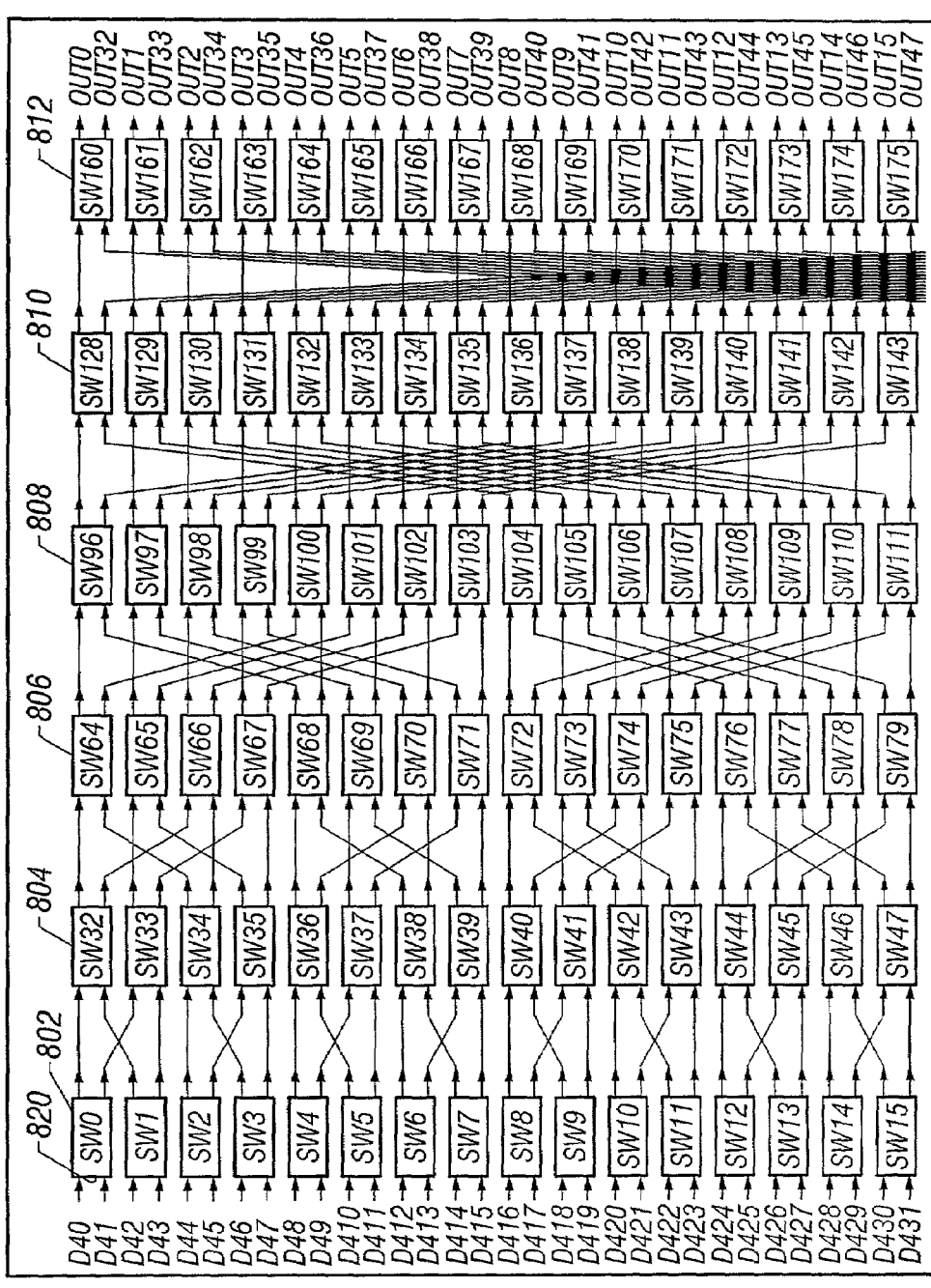
Figures 2, 8A:
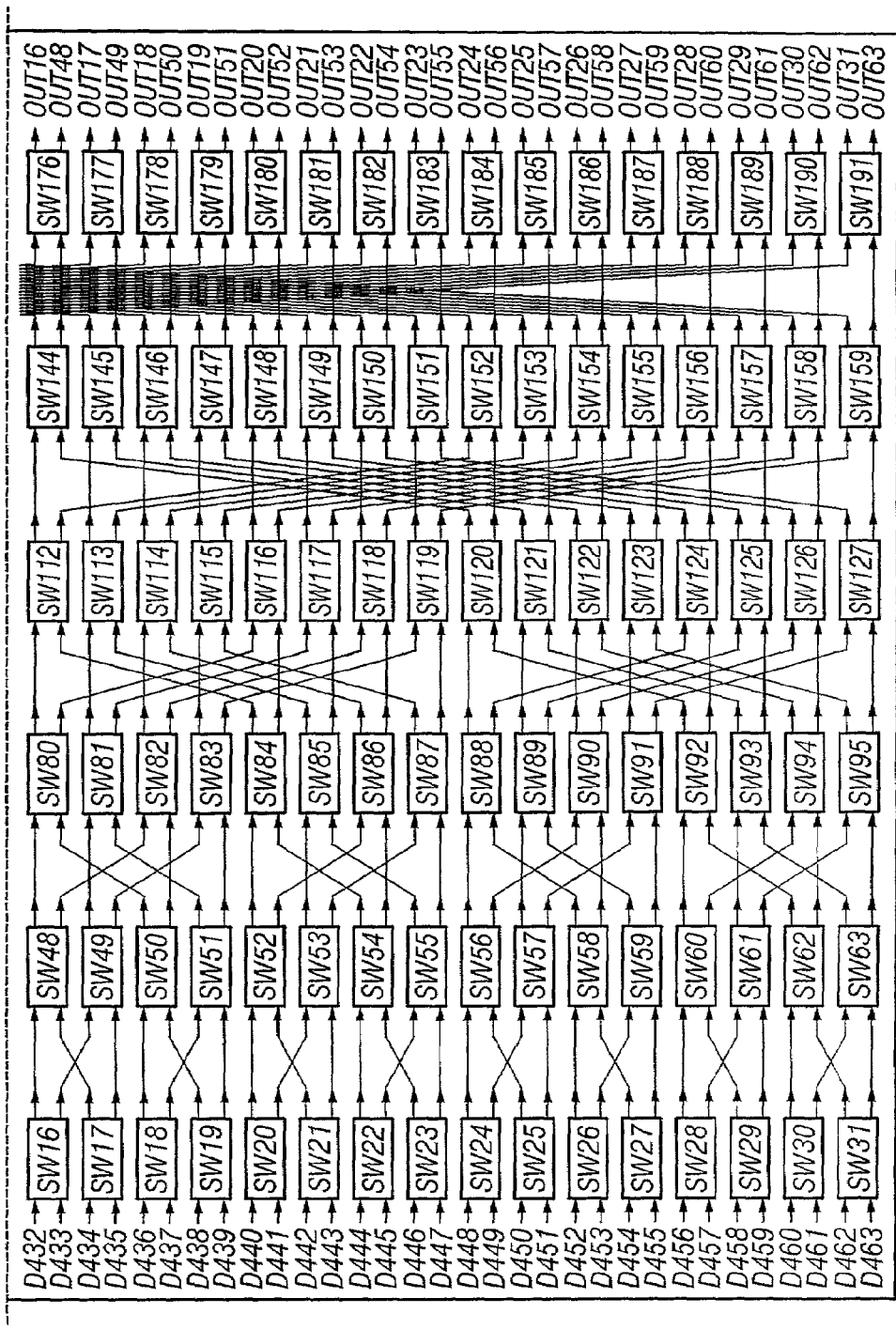

FIG. 8 is a block diagram of one embodiment for a Banyan switch 518 of the present invention. In one embodiment, the Banyan switch 518 comprises a conventional Banyan switching structure having a number of inputs equal to the bitwidth of the first signal propagation path, or in other words, equal to the internal bitwidth w of the Banyan-switched datapath 420. The Banyan switch 518 may include N switching stages, where N may equal $\log_2(w)$ or $\log_4(w)$. In the case of $\log_2(w)$ stages, each switching stage includes N/2 switching cells. Each switching cell may comprise a conventional 2×2 crossbar switching structure. Therefore, in a 64-bit implementation, the Banyan switch 518 comprises 6 switching stages 802, 804, 806, 808, 810, and 812, each of which includes 32 switching cells 820. Each switching cell 820 includes a control input coupled to the switch control unit 520. In FIG. 8, the control inputs are not explicitly shown in order to reduce visual complexity. In one embodiment, the default operation of the Banyan switch 518 corresponds to signal flow-through or pass-through, i.e., directly routing signals present at the Banyan-switch inputs to the corresponding Banyan-switch outputs without any shift.

Figure 9A:
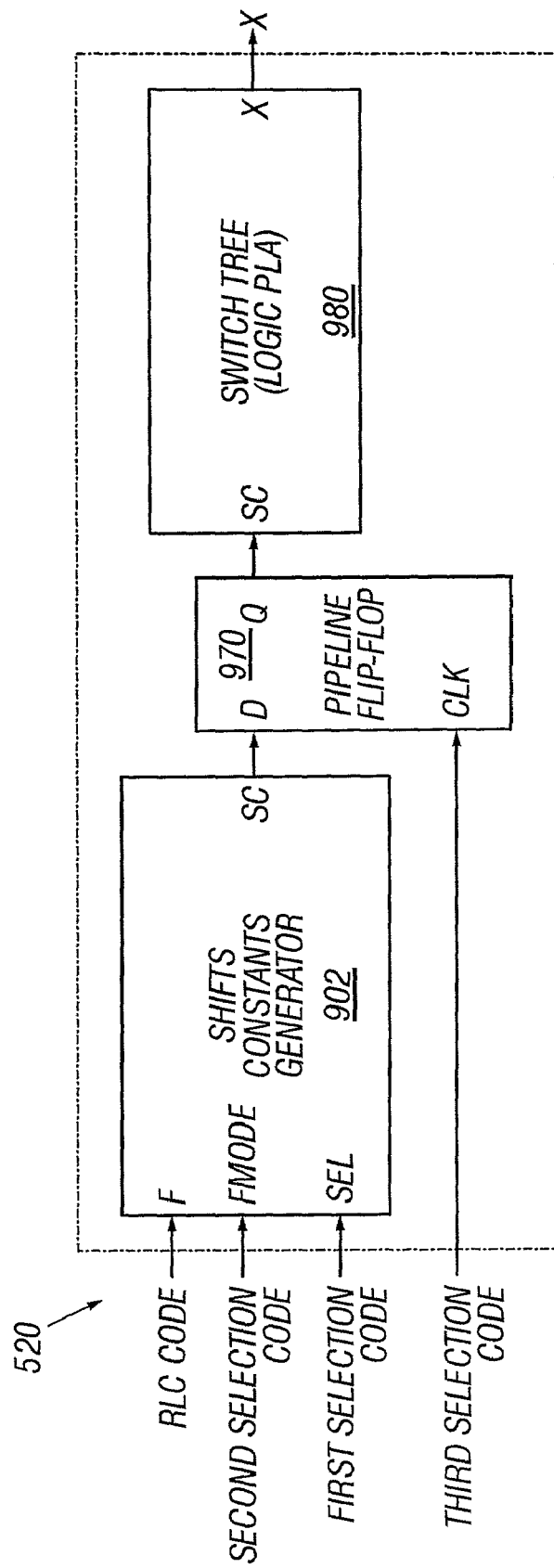
FIG. 9A is a block diagram of an embodiment for a switch-control unit.

The switch control unit 520 generates control signals that determine particular routing and/or bitfield manipulation operations performed by the Banyan switch 518. FIG. 9A is a block diagram of a switch control unit 520. In one embodiment, the switch control unit 520 comprises a shift constants generator 902, a pipeline flip-flop 970, and a switch tree 980. The shift constants generator 902 is coupled to receive signals from the control line 590 and output signals to the pipeline flip-flop 970, while the switch tree 980 is coupled to receive signals from the pipeline flip-flop 970 and to output switch control signals to the Banyan switch 518. Also, the pipeline flip-flop 970 includes a clock input coupled to the control line 590.

The shift constants generator 902 is coupled to receive a Rotate Left Circular (RLC) code and a set of selection codes from the control line 590. In response to the selection codes, the shift constants generator 902 outputs a shift code, which may be derived from or based upon the RLC code. Tables 3A, 3B, and 3C show exemplary sequences of selection-code bit values for directing the operation of the switch control unit 520.

In Table 3A, a first selection code spanning two bits may select whether the shift constants generator 902 outputs the RLC code, an inverted or complemented RLC code, a zoned RLC code, or a fixed RLC code, namely, RLC by 4.

TABLE 3A

CONTROL LOGIC INTERFACE

| CTRL[7:6] Bits | Operation Performed |
|---|---|
| 00 | RLC (FBITS) SHIFTCODE |
| 01 | INVERSE RCL (FBITS) SHIFTCODE |
| 10 | ZONED RLC SHIFTCODES W/CTRL[9:8] |
| 11 | SHIFTCODE = RLC(4) |

In Table 3B, a second selection code may select whether a zoned RLC code corresponds to no shift, i.e., RLC by 0 bit positions, or a shift corresponding to a particular bit position multiple. In the context of a 64-bit word size, the second selection code spans two bits, and may select a shift that is a multiple of 8 bit positions, 16 bit positions, or 32 bit positions. Those skilled in the art will recognize that various embodiments of the present invention may support shifts that are multiples of other numbers of bit positions, particularly as the word size w varies.

TABLE 3B

CONTROL LOGIC INTERFACE

| CTRL[9:8] Bits | Operation Performed |
|---|---|
| 00 | RLC(0) SHIFTCODE |
| 01 | 3 FBITS: 0, 8, 16, 24, 32, 48, 56 SHIFTCODES |
| 10 | 2 FBITS: 0, 16, 32, 48 SHIFTCODES |
| 11 | 1 FBIT: 0, 32 SHIFTCODES |

Finally, in Table 3C, a third selection code spanning a single bit may select whether the switch control unit 520 outputs a no-operation signal; or stores the shift code output by the shift constants generator 902 and subsequently generates a switch control signal that directs the Banyan switch 518 to perform a particular shift.

TABLE 3C

CONTROL LOGIC INTERFACE

| CTRL[10] Bit | Operation Performed |
|---|---|
| 0 | DO NOTHING |
| 1 | STORE SHIFTCODE; CONTROL BANYAN |

Figure 9B:
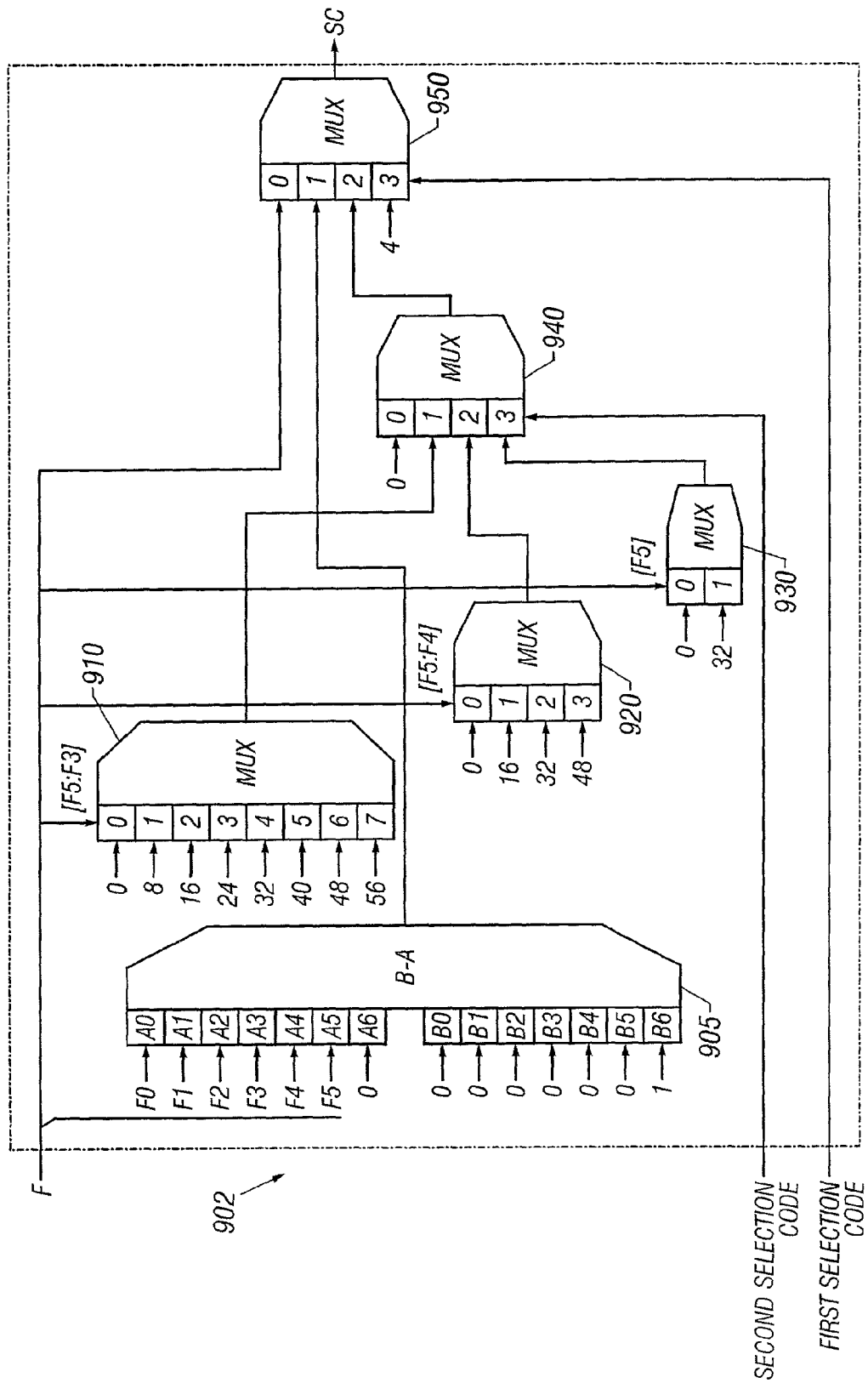
FIG. 9B is a block diagram of a n embodiment for a shift constants generator .

FIG. 9B is a block diagram of a shift constants generator 902. In one embodiment, the shift constants generator 902 comprises a subtractor 905 and a first through a fifth multiplexor 910, 920, 930, 940, and 950. The subtractor 905 includes inputs coupled to receive the RLC code, as well as 1 and 0 bits such that the subtractor 905 may generate the inverse, negative, or complement of the RLC code. In one embodiment, the inverse of the RLC code corresponds to a Rotate Right Circular (RRC) code, as understood by those skilled in the art.

The first multiplexor 910 comprises a conventional multiplexor that has data inputs providing shift code values corresponding to multiples of 8 bit positions. Thus, for a 64-bit word size, the data inputs provide signal values of 0, 8, 16, 24, 32, 40, 48, and 56. The first multiplexor 910 also includes a control input coupled to receive particular bits within the RLC code. The second multiplexor 920 comprises a conventional multiplexor having data inputs that provide shift code values corresponding to multiples of 16 bit positions. Hence, for a 64-bit word size, the data inputs of the second multiplexor provide signal values of 0, 16, 32, and 48. The second multiplexor 920 also includes a control input coupled to receive particular RLC code bits. Similar to the first and second multiplexors 910 and 920, the third multiplexor 930 comprises a conventional multiplexor having data inputs that provide shift code values corresponding to multiples of 32 bit positions. Therefore, the data inputs of the third multiplexor provide signal values of 0 and 32 for a 64-bit word size. The third multiplexor 930 also includes a control input coupled to receive particular RLC code bits.

The fourth multiplexor 940 comprises a conventional multiplexor having data inputs coupled to receive a 0 value and to receive an output of each of the first, second, and third multiplexors 910, 920 and 930. The fourth multiplexor 940 also includes a control input coupled to receive the second selection code as described above. The fourth multiplexor 940 may select a zoned RLC code that is generated by the first multiplexor 910, the second multiplexor 920, or the third multiplexor 930. The fifth multiplexor 950 comprises a conventional multiplexor having data inputs coupled to receive the RLC code, the inverted RLC code, a zoned RLC code generated by the fourth multiplexor 940, and a fixed RLC code. The fifth multiplexor 950 also includes a control input coupled to receive the first selection code described above. In addition, the fifth multiplexor 950 includes an output that is coupled to deliver the shift code to the pipeline flip-flop 970 shown in FIG. 9A.

The pipeline flip-flop 970 in one embodiment comprises a conventional flip-flop having a clock input coupled to the control line 590. The pipeline flip-flop 970 receives the shift code from the shift constants generator 902. In response to the third selection code, the pipeline flip-flop 970 may store the shift code, and output it to the switch tree 980. The switch tree 980 generates and outputs switch control signals to the Banyan switch 518. In one embodiment, the switch tree 980 comprises a low-fanout, wide control network that may be implemented with a Programmable Logic Array (PLA) or a sparse CLB matrix, which may result from the implementation of the Banyan switch 518. In FIG. 5, the bitwise function unit 522 selectively performs bitwise Boolean operations upon w-bit words received from the Banyan switch 518. If the Boolean operations are not required, the bitwise function unit 522 transfers or bypasses data received at its input to its output. If a Boolean operation is required, the bitwise function unit 522 may load a first operand during a first clock cycle, accept a second operand, perform a given Boolean operation using the first and second operands, and output a result during a second clock cycle. Preferably, the aforementioned first and second clock cycles are sequential.

Figure 10:
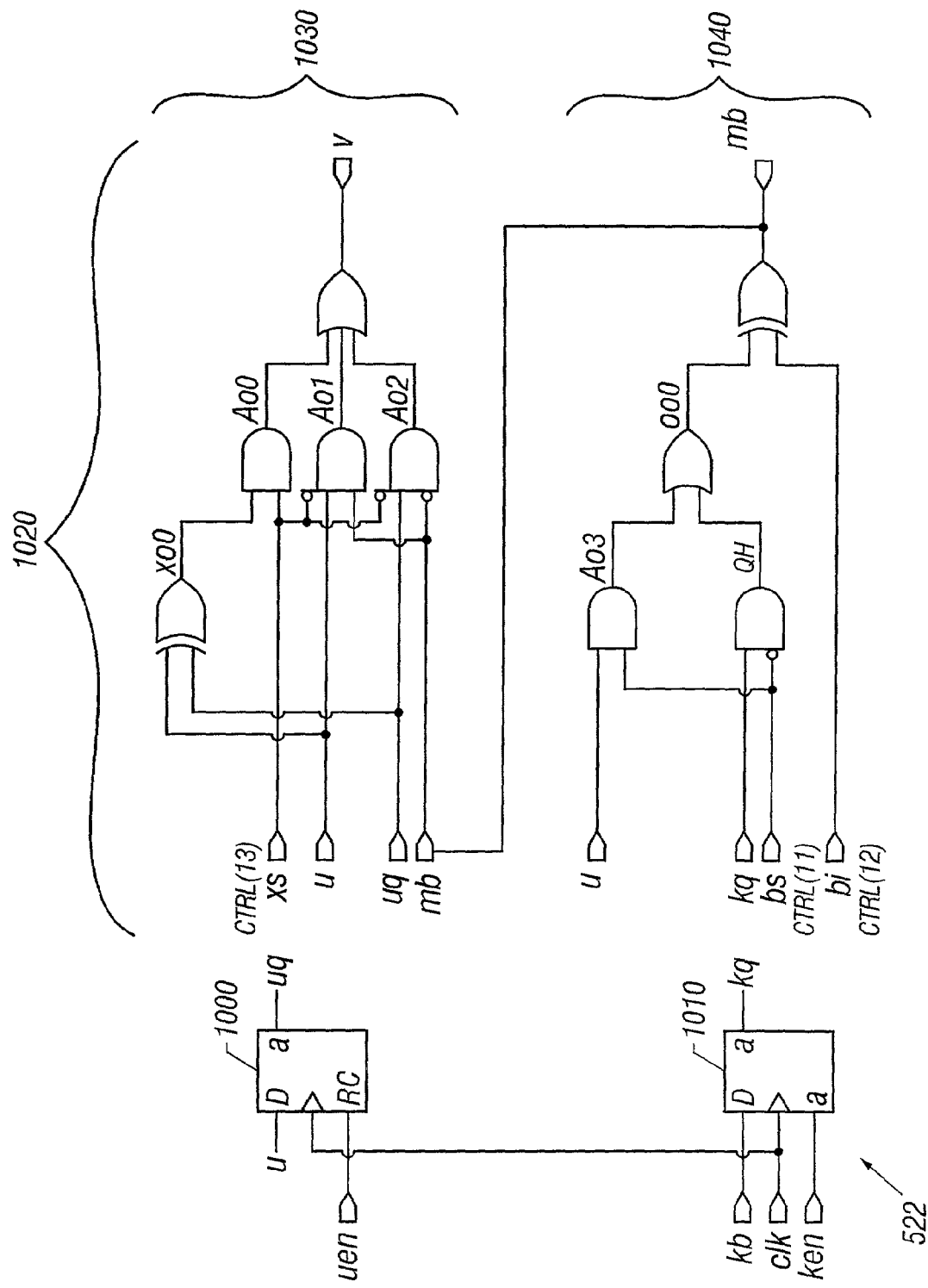
FIG. 10 is a block diagram of an embodiment for a bitwise function unit.

FIG. 10 is a block diagram of a bitwise function unit 522. In one embodiment, the bitwise function unit 522 comprises a first register 1000, a second register 1010, and a Boolean unit 1020. The first and second registers 1000 and 1010 each include an enable input and a clock input coupled to the control line 590. Additionally, the first register 1000 includes a data input coupled to receive a data word u from the Banyan switch, and an output that provides the stored data word $u_q$. The second register 1010 includes an input coupled to receive a constant $k_b$ from the constant generator 514, and an output that provides the stored constant $k_q$. The Boolean unit 1020 has a first data input coupled to receive the data word u, a second data input coupled to receive the stored data word $u_q$ from the first register 1000, a constant input coupled to receive the stored constant $k_q$ from the second register 1010, and an output that provides a data word v to the accumulator 526. In addition, the Boolean unit 1020 has a bit select input, an invert select input, and a function select input, each of which respectively receives bit select, invert select, and function select signals from the control line 590.

The Boolean unit 1020 may comprise a combinational logic that includes a plurality of AND gates, OR gates, and XOR gates. The Boolean unit 1020 selectively routes and/or operates upon u, $u_q$ and $k_q$ to generate v. In particular, the Boolean unit 1020 includes a data word stage 1030 and a constant stage 1040. The constant stage 1040 generates a merge bit $m_b$ that provides a feedback to an input of the data word stage 1030, such that the value of v may depend upon the value of $k_q$ in addition to the bit select and bit invert signals.

Tables 4A, 4B, and 4C show exemplary routing and/or Boolean operations performed by the Boolean unit 1020 in response to particular signal values for bit select, invert select, and function select. Specifically, a bit select signal with a 0 value makes v equal to u, while a bit select signal having a value of 1 makes v equal to $k_q$. An invert select signal having a 0 value results in a non-inverted u or $k_q$ selection, while an invert select signal having a 1 value results in an inverted u or $k_q$ selection. A function select signal having a 0 value indicates no Boolean operation is performed, while a function select signal having a 1 value results in v equal to (uXOR$u_q$).

TABLE 4A

| CONTROL LOGIC INTERFACE | |
|---|---|
| CTRL[11] Bit | Operation Performed |
| 0 | SELECT U-INPUT FOR OUTPUT TO V |
| 1 | SELECT KQ-REGISTER FOR OUTPUT TO V |

TABLE 4B

| CONTROL LOGIC INTERFACE | |
|---|---|
| CTRL[12] Bit | Operation Performed |
| 0 | U/KQ SELECTION IS NON-INVERTED |
| 1 | U/KQ SELECTION IS INVERTED |

TABLE 4C

| CONTROL LOGIC INTERFACE | |
|---|---|
| CTRL[13] Bit | Operation Performed |
| 0 | DO NOTHING |
| 1 | ROUTE U $\oplus$ UQ TO V |

In FIG. 5, the pipeline register 524 comprises a conventional register having a clock input and an enable input, and serves as a delay isolation or matching interface between the first and second signal propagation paths 580 and 582 as indicated above. Those skilled in the art will recognize that the pipeline register 524 could reside elsewhere within the Banyan-switched datapath 420. Those skilled in the art will also recognize that multiple pipeline registers 524 could be employed within the Banyan-switched datapath 420 to enhance pipelined data processing capabilities.

Figure 11:
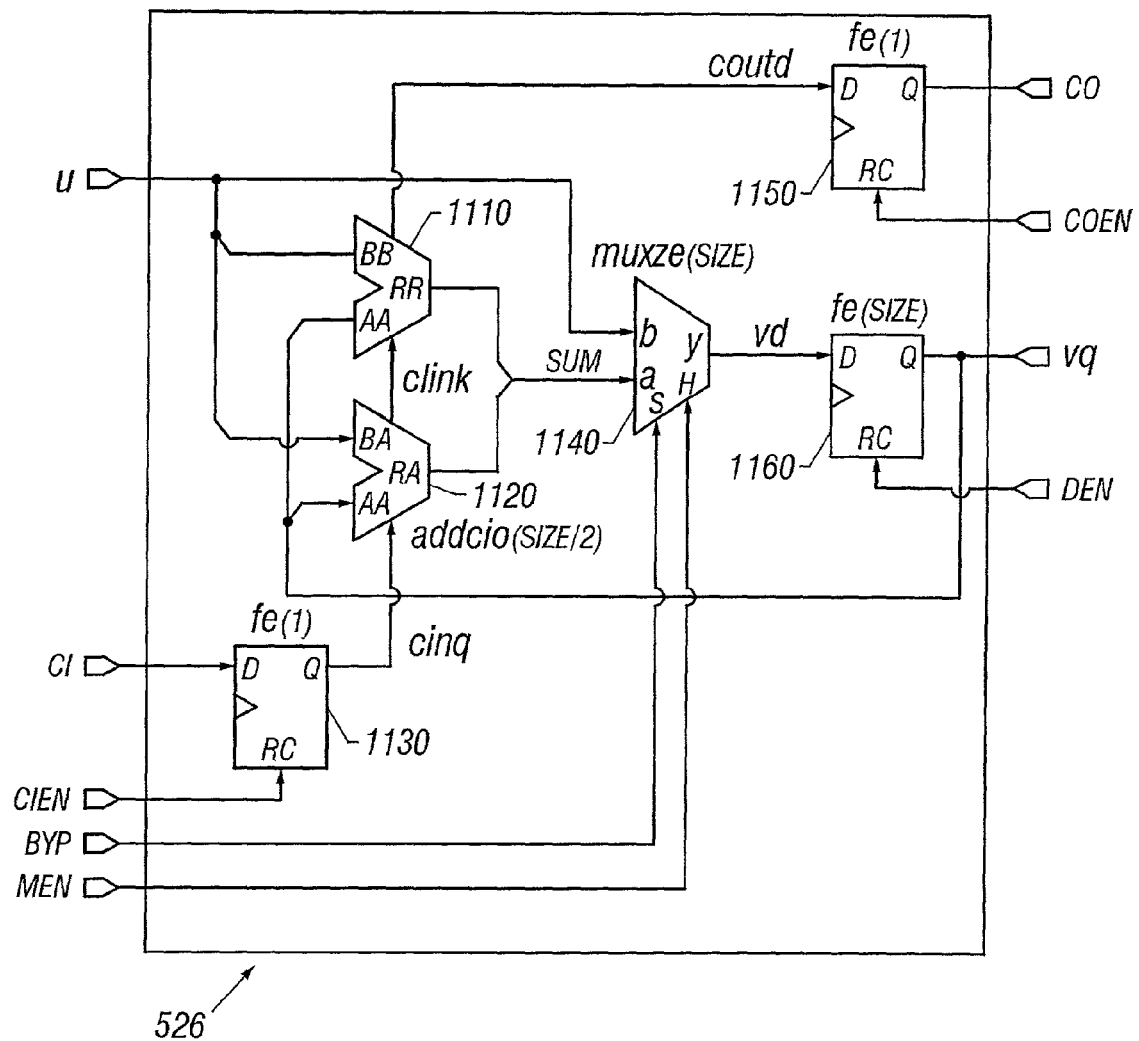
FIG. 11 is a block diagram of an embodiment for an accumulator.

FIG. 11 is a block diagram of an accumulator 526. In one embodiment, the accumulator 526 comprises circuitry capable of performing two's complement addition on w-bit words, while other arithmetic operations may be performed within the first signal propagation path 580 prior to the accumulator 526. The accumulator 526 receives data input (u), carry input (CI), carry input enable (CIEN), bypass input (BYP), M-enable (MEN), carry output enable (COEN), and D-enable (DEN). The accumulator 526 generates carry output (CO) and data output ($V_q$). The accumulator 526 comprises a 32-bit adders 1110 and 1120, a d flip-flop 1130, a multiplexor 1140, and clock registers 1150 and 1160.

The DTM register 528 comprises a conventional register that serves as a data transfer interface for signals directed from the Banyan-switched datapath 420 to the memory 430. The DTM register 528 includes a clock input and an enable input, which are respectively coupled to receive a clock signal and a load enable signal from the control line 590. In response to the load enable signal and the clock signal, the DTM register 528 loads data signals present at its data input. The bitwidth supported by the DTM register 528 matches that supported by the DFM register 512 but may differ from that of the Banyan-switched datapath 420 as described above.

The instruction register 530 comprises a conventional register that serves as an instruction transfer interface between the register file 510 and the control unit 410. The instruction register 530 includes a clock input and an enable input that are respectively coupled to receive a clock signal and an enable signal from the control line 590. The address register 532 comprises a conventional register that serves as an address output port to the local memory 430. In a manner analogous to the instruction register 530, the address register includes clock and enable inputs coupled to receive clock and enable signals from the control line, respectively.

As indicated above, the present invention may be implemented in an FPGA, such as in a Xilinx XC4013 FPGA. Those skilled in the art will recognize that larger and/or multiple Banyan switched-datapaths 420 could reside within a larger FPGA, such as one also manufactured by Xilinx.

Table 5 shows an exemplary operational flow sequence for performing a field-insert operation. At the first step, the register file 510 reads addresses, the constant generator 514 performs an operation function, the switch control 520 generates or uses a constant, the routing unit 516 performs an operation function, the Banyan switch 518 performs an operation function, and the bitwise function unit 522 enables a register. At the second step, the register file 510 reads data, the constant generator 514, the switch control unit 520 and the routing unit 516 each generate or use a constant, the Banyan switch 518 and the bitwise function unit 522 each perform an operation function, and the pipeline register 524 enables a register. At the third step, the register file 510 writes addresses and the accumulator 526 performs a bypass operation.

TABLE 5

| | | | |
|---|---|---|---|
| regfile64 | RA | R | WA |
| Congen | F | K | |
| tree-control | K | K | |
| Kmux | F | K | |
| Banyan | F | F | |
| bitselect_unit | E | F | |
| Plra | | E | |
| Adder | | | B |

Table 6 shows an exemplary operational flow sequence for performing an AND operation. At the first step, the register file 510 reads addresses, the constant generator 514, the switch control unit 520 and the routing unit 516 each generate or use a constant. At the second step, the Banyan switch 518 and the bitwise function unit 522 each perform a bypass operation, and the pipeline register 524 enables a register. At the third step, the register file 510 reads data, and the pipeline register 524 and the accumulator 526 each enable a register. At the fourth step, the register file 510 writes data, and the accumulator 526 performs an operation function.

TABLE 6

| | | | |
|---|---|---|---|
| regfile64 | RA | A | W |
| congen | K | | |
| tree-control | K | | |
| kmux | K | | |
| banyan | | B | |
| bitselect_unit | | B | |
| plra | | E | E |
| adder | | | E | F |

Table 7 shows an exemplary operational flow sequence for performing an add operation. At the first step, the register file 510 reads addresses, the constant generator 514 performs an operation function, the switch control unit 520 generates or uses a constant, the routing unit 516 performs an operation function, the Banyan switch 518 performs a bypass function, and the bitwise function unit 522 enables a register. At the second step, the register file 510 reads data, the Banyan switch 518 performs a bypass function, the bitwise function unit 522 performs an operation function, and the pipeline register 524 performs a bypasses function. At the third step, the register file 510 writes and the accumulator 526 performs a bypass function.

TABLE 7

| | | | |
|---|---|---|---|
| regfile64 | RA | A | W |
| congen | F | | |
| tree-control | K | | |
| kmux | F | | |
| banyan | B | B | |
| bitselect_unit | E | F | |
| plra | | B | |
| adder | | | B |

While the present invention has been described with reference to certain embodiments, many variations upon or modifications to such embodiments may be provided. The description herein provides for such modifications to the present invention, which is limited only by the following claims:

The invention claimed is:

1. A processing system comprising:
   a register file having an input and an output;
   a routing unit having a first input, a second input, and an output, the first input of the routing unit coupled to the output of the register file, the routing unit capable of assembling and selecting a data signal;
   a Banyan switch having a first input, a second input, and an output, the first input of the Banyan switch coupled to the output of the routing unit, the Banyan switch capable of controlling information pathways and performing routing functions on the data signal; and
   an arithmetic logic unit having an input and an output, the input of the arithmetic logic unit coupled to output of the Banyan switch and the output of the arithmetic logic unit coupled to input of the register file.

2. The processing system of claim 1 wherein the arithmetic logic unit comprises:
   a bitwise function unit having an input and an output, the input of the bitwise function unit coupled to the output of the Banyan switch;
   a pipeline register having an input and an output, the input of the pipeline register coupled to the output of the bitwise function unit; and
   an accumulator having an input and an output, the input of the accumulator coupled to the output of the pipeline register and the output of the accumulator coupled to the input of the register file.

3. The processing system of claim 1 wherein the Banyan switch comprises N data inputs, and $\log_M(N)$ switching stages.

4. The processing system of claim 3 wherein M is selected from a group comprising 2 and 4.

5. The processing system of claim 4 further comprising a switch control unit having an input and an output, the output of the switch control unit coupled to second input of the Banyan switch.

6. The processing system of claim 5 further comprising a constant generator having an input and an output, the output of the constant generator coupled to the second input of the routing unit.

7. The processing system of claim 5 wherein the switch control unit comprises:
a shift constants generator, having an input and an output, the input of the shift constants generator coupled to the input of the switch control unit;
a pipeline flip-flop having an input and an output, the input of the pipeline flip-flop coupled to the output of the shift constants generator; and
a switch tree having an input and an output, the input of the switch tree coupled to the output of the pipeline flip-flop, and the output of the switch tree coupled to the output of the switch control unit.

8. The processing system of claim 3 wherein M is 2 and each of the switching stages has N/2 switching cells.

9. The processing system of claim 1 wherein the routing unit comprises:
a control logic generating a control signal having groups of bits; and
a plurality of logics respectively operating on the groups of bits.

10. The processing system of claim 1 further comprising a constant generator having an output coupled to the second input of the routing unit.

11. The processing system of claim 10 further comprising a switch control unit having an input and an output, the output of the switch control unit coupled to the second input of the Banyan switch.

12. The processing system of claim 1 further comprising a switch control unit having an input and an output, the output of the switch control unit coupled to the second input of the Banyan switch.

13. A computer-implemented method of processing data for use with a system for routing and manipulating data, the method comprising:
receiving data;
selectively aligning and transferring the data;
selectively routing the data using a Banyan switch; and
performing arithmetic or logic functions on the data.

14. The method of claim 13 wherein selectively routing the data includes performing bitfield manipulation operations on the data.

15. The method of claim 13 wherein selectively routing the data includes shifting or rotating the data.

16. The method of claim 13 wherein selectively routing the data comprises:
receiving N data inputs; and
routing the N data inputs in $\log_M(N)$ switching stages, where M is 2 or 4.

17. The method of claim 16 wherein the stages have N/2 cells, the cells capable of transferring a data input from any input of the cell to any output of the cell.

18. The method of claim 13 wherein selectively aligning and transferring the data comprises:
generating a routing control signal having groups of bits; and
operating on the groups of bits to control the aligning and transferring.

19. The method of claim 13 wherein selectively aligning and transferring the data comprises transferring conjoined data, transferring a shifted positive constant, transferring a shifted two's-complemented constant, conjoining flag bits, transferring a sign-extended constant, or transferring a shifted signal.

20. The method of claim 13 further comprising generating a switching control signal that specifies a routing operation or bitfield manipulation operation.

21. The method of claim 20 wherein the routing operation or bitfield manipulation operation comprises a circular shift operation, a logical shift operation, or a data alignment.

22. The method of claim 20 wherein generating a switching control signal comprises:
receiving an input code;
outputting a shift code derived from the input code; and
generating and outputting the switching control signal in response to the shift code.

23. The method of claim 22 wherein the input code is a Rotate Left Circular (RLC) code.

24. The method of claim 23 wherein the shift code is the RLC code, an inverted RLC code, a zoned RLC code, or a fixed RLC code.

25. The method of claim 24 wherein the zoned RLC code includes a bit position shift indication.

26. The method of claim 13 further comprising selectively generating and outputting constants or bitfield mask primitives.

27. A processing system comprising:
means for receiving data;
means for selectively aligning and transferring the data;
a Banyan switch for selectively routing the data; and
means for performing arithmetic or logic functions on the data.

28. The processing system of claim 27 wherein the Banyan switch comprises N stages for routing the data, the N stages each having N/2 means for transferring a signal from any input to any output.

29. The processing system of claim 27 further comprising means for generating a switching control signal that specifies a routing operation or bitfield manipulation operation, the means for generating a switching control signal coupled to the Banyan switch.

30. The processing system of claim 29 wherein the routing operation or bitfield manipulation operation comprises a circular shift operation, a logical shift operation, or a data alignment.

31. The processing system of claim 29 wherein the means for generating a switching control signal comprises:
means for receiving an input code;
means for outputting a shift code derived from the input code; and
means for generating and outputting the switching control signal in response to the shift code.

* * * * *